(12) United States Patent
Duthaler et al.

(10) Patent No.: US 6,377,387 B1
(45) Date of Patent: Apr. 23, 2002

(54) METHODS FOR PRODUCING DROPLETS FOR USE IN CAPSULE-BASED ELECTROPHORETIC DISPLAYS

(75) Inventors: Gregg M. Duthaler, Brookline; Andrew L. Loxley, Allston, both of MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 09/543,639

(22) Filed: Apr. 6, 2000

Related U.S. Application Data

(63) Continuation-in-part of application No. 09/413,009, filed on Oct. 6, 1999, now Pat. No. 6,262,833.
(60) Provisional application No. 60/127,964, filed on Apr. 6, 1999.

(51) Int. Cl.[7] .............................. G02B 26/00; B01J 13/02
(52) U.S. Cl. .......................... 359/296; 345/107; 264/4; 264/4.1; 424/450
(58) Field of Search ................................ 359/296, 452; 264/4, 4.1, 4.3, 8, 15; 345/108, 107, 105; 424/450, 1.21, 9.52

(56) References Cited

U.S. PATENT DOCUMENTS

| | | |
|---|---|---|
| 2,766,478 A | 10/1956 | Raley, Jr. et al. |
| 2,800,457 A | 7/1957 | Green et al. |
| 3,036,388 A | 5/1962 | Tate |
| 3,384,488 A | 5/1968 | Tulagin et al. |
| 3,389,194 A | 6/1968 | Somerville |
| 3,406,363 A | 10/1968 | Tate |
| 3,423,489 A | 1/1969 | Arens et al. |
| 3,460,248 A | 8/1969 | Tate |
| 3,585,381 A | 6/1971 | Hodson et al. |
| 3,612,758 A | 10/1971 | Evans et al. |
| 3,668,106 A | 6/1972 | Ota |
| 3,670,323 A | 6/1972 | Sobel et al. |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,806,893 A | 4/1974 | Ohnishi et al. |
| 3,850,627 A | 11/1974 | Wells et al. |
| 3,870,517 A | 3/1975 | Ota et al. |

(List continued on next page.)

FOREIGN PATENT DOCUMENTS

| | | |
|---|---|---|
| CH | 563 807 | 7/1975 |
| EP | 0 186 710 A1 | 7/1986 |
| EP | 0 240 063 B1 | 10/1987 |

(List continued on next page.)

OTHER PUBLICATIONS

Anders (1986), "Monodisperse Droplet Streams and Their Application in Space," *Proc. Symp. Fluid Dynam.*, pp. 119–125.

Ballinger et al., (Mar. 1973) "Magnetic Recording Paper is Erasable," *Electronics*, , pp. 73–76.

Beilin et al., (1986) "8.5: 2000–Character Electrophoretic Display," *SID 86 Digest*, , pp. 136–140.

(List continued on next page.)

*Primary Examiner*—Loha Ben
(74) *Attorney, Agent, or Firm*—Testa, Hurwitz & Thibeault, LLP

(57) ABSTRACT

Methods are provided for forming a dispersion of substantially uniform droplets. An internal phase that includes a plurality of particles suspended in a first fluid is provided and an external phase including a second fluid is provided. The internal phase is vibrated and the internal phase is applied to the external phase. Either the internal phase or a combination of the internal and external phases form a series of droplets or complex droplets of substantially uniform size.

22 Claims, 17 Drawing Sheets

U.S. PATENT DOCUMENTS

| | | |
|---|---|---|
| 3,892,568 A | 7/1975 | Ota |
| 3,909,116 A | 9/1975 | Kohashi |
| 3,922,255 A | 11/1975 | Koestler et al. |
| 4,001,140 A | 1/1977 | Foris et al. |
| 4,041,481 A | 8/1977 | Sato |
| 4,045,327 A | 8/1977 | Noma et al. |
| 4,062,009 A | 12/1977 | Raverdy et al. |
| 4,068,927 A | 1/1978 | White |
| 4,071,430 A | 1/1978 | Liebert |
| 4,087,376 A | 5/1978 | Foris et al. |
| 4,088,395 A | 5/1978 | Giglia |
| 4,093,534 A | 6/1978 | Carter et al. |
| 4,123,206 A | 10/1978 | Dannelly |
| 4,123,346 A | 10/1978 | Ploix |
| 4,126,528 A | 11/1978 | Chiang |
| 4,126,854 A | 11/1978 | Sheridon |
| 4,143,103 A | 3/1979 | Sheridon |
| 4,143,472 A | 3/1979 | Murata et al. |
| 4,147,932 A | 4/1979 | Lewis |
| 4,149,149 A | 4/1979 | Miki et al. |
| 4,166,800 A | 9/1979 | Fong |
| 4,196,437 A | 4/1980 | Hertz |
| 4,201,691 A | 5/1980 | Asher et al. |
| 4,203,106 A | 5/1980 | Dalisa et al. |
| 4,211,668 A | 7/1980 | Tate |
| 4,218,302 A | 8/1980 | Dalisa et al. |
| 4,231,641 A | 11/1980 | Randin |
| 4,261,653 A | 4/1981 | Goodrich |
| 4,272,596 A | 6/1981 | Harbour et al. |
| 4,273,672 A | 6/1981 | Vassiliades |
| 4,279,632 A | 7/1981 | Frosch |
| 4,285,801 A | 8/1981 | Chiang |
| 4,298,448 A | 11/1981 | Müller et al. |
| 4,303,433 A | 12/1981 | Torobin |
| 4,305,807 A | 12/1981 | Somlyody |
| 4,311,361 A | 1/1982 | Somlyody |
| 4,314,013 A | 2/1982 | Chang |
| 4,324,456 A | 4/1982 | Dalissa |
| 4,368,952 A | 1/1983 | Murata et al. |
| 4,390,403 A | 6/1983 | Batchelder |
| 4,418,346 A | 11/1983 | Batchelder |
| 4,419,383 A | 12/1983 | Lee |
| 4,422,082 A | 12/1983 | Louzil |
| 4,438,160 A | 3/1984 | Ishikawa et al. |
| 4,439,507 A | 3/1984 | Pan et al. |
| 4,444,961 A | 4/1984 | Timm |
| 4,450,440 A | 5/1984 | White |
| 4,502,934 A | 3/1985 | Gazard et al. |
| 4,522,472 A | 6/1985 | Liebert et al. |
| 4,538,156 A | 8/1985 | Durkee et al. |
| 4,543,306 A | 9/1985 | Dubois et al. |
| 4,605,284 A | 8/1986 | Fergason |
| 4,620,916 A | 11/1986 | Zwemer et al. |
| 4,623,706 A | 11/1986 | Timm et al. |
| 4,643,528 A | 2/1987 | Bell, Jr. |
| 4,648,956 A | 3/1987 | Marshall et al. |
| 4,655,897 A | 4/1987 | DiSanto et al. |
| 4,666,673 A | 5/1987 | Timm |
| 4,673,303 A | 6/1987 | Sansone et al. |
| 4,707,080 A | 11/1987 | Fergason |
| 4,732,830 A | 3/1988 | DiSanto et al. |
| 4,742,345 A | 5/1988 | DiSanto et al. |
| 4,746,917 A | 5/1988 | DiSanto et al. |
| 4,748,366 A | 5/1988 | Taylor |
| 4,833,464 A | 5/1989 | DiSanto et al. |
| 4,888,140 A | 12/1989 | Schlameus et al. |
| 4,889,603 A | 12/1989 | DiSanto et al. |
| 4,891,245 A | 1/1990 | Micale |
| 4,909,959 A | 3/1990 | Lemaire et al. |
| 4,919,521 A | 4/1990 | Tada et al. |
| 4,931,019 A | 6/1990 | Park |
| 4,947,219 A | 8/1990 | Boehm |
| 4,960,351 A | 10/1990 | Kendall, Jr. et al. |
| 5,009,490 A | 4/1991 | Kouno et al. |
| 5,017,225 A | 5/1991 | Nakanishi et al. |
| 5,040,960 A | 8/1991 | Shioya et al. |
| 5,041,824 A | 8/1991 | DiSanto et al. |
| 5,053,763 A | 10/1991 | DiSanto et al. |
| 5,057,363 A | 10/1991 | Nakanishi |
| 5,059,694 A | 10/1991 | Delabouglise et al. |
| 5,066,105 A | 11/1991 | Yoshimoto et al. |
| 5,066,559 A | 11/1991 | Elmasry et al. |
| 5,066,946 A | 11/1991 | DiSanto et al. |
| 5,070,326 A | 12/1991 | Yoshimoto et al. |
| 5,077,157 A | 12/1991 | DiSanto et al. |
| 5,082,351 A | 1/1992 | Fergason |
| 5,099,256 A | 3/1992 | Anderson |
| 5,105,185 A | 4/1992 | Nakanowatari et al. |
| 5,128,226 A | 7/1992 | Hung |
| 5,128,785 A | 7/1992 | Yoshimoto et al. |
| 5,132,049 A | 7/1992 | Garreau et al. |
| 5,138,472 A | 8/1992 | Jones et al. |
| 5,149,826 A | 9/1992 | Delabouglise et al. |
| 5,151,032 A | 9/1992 | Igawa |
| 5,174,882 A | 12/1992 | DiSanto et al. |
| 5,177,476 A | 1/1993 | DiSanto et al. |
| 5,185,226 A | 2/1993 | Grosso et al. |
| 5,187,609 A | 2/1993 | DiSanto et al. |
| 5,204,424 A | 4/1993 | Roncali et al. |
| 5,216,416 A | 6/1993 | DiSanto et al. |
| 5,216,530 A | 6/1993 | Pearlman et al. |
| 5,223,115 A | 6/1993 | DiSanto et al. |
| 5,223,823 A | 6/1993 | DiSanto et al. |
| 5,247,290 A | 9/1993 | DiSanto et al. |
| 5,250,932 A | 10/1993 | Yoshimoto et al. |
| 5,250,938 A | 10/1993 | DiSanto et al. |
| 5,254,981 A | 10/1993 | DiSanto et al. |
| 5,255,017 A | 10/1993 | Lam |
| 5,260,002 A | 11/1993 | Wang |
| 5,262,098 A | 11/1993 | Crowley et al. |
| 5,266,098 A | 11/1993 | Chun et al. |
| 5,266,937 A | 11/1993 | DiSanto et al. |
| 5,268,448 A | 12/1993 | Buechner et al. |
| 5,270,843 A | 12/1993 | Wang |
| 5,272,238 A | 12/1993 | Garnier et al. |
| 5,276,113 A | 1/1994 | Hashiguchi et al. |
| 5,276,438 A | 1/1994 | DiSanto et al. |
| 5,279,511 A | 1/1994 | DiSanto et al. |
| 5,279,694 A | 1/1994 | DiSanto et al. |
| 5,293,528 A | 3/1994 | DiSanto et al. |
| 5,296,974 A | 3/1994 | Tada et al. |
| 5,298,833 A | 3/1994 | Hou |
| 5,302,235 A | 4/1994 | DiSanto et al. |
| 5,303,073 A | 4/1994 | Shirota et al. |
| 5,304,439 A | 4/1994 | DiSanto et al. |
| 5,315,312 A | 5/1994 | DiSanto et al. |
| 5,326,484 A | 7/1994 | Nakashima et al. |
| 5,344,594 A | 9/1994 | Sheridon |
| 5,359,346 A | 10/1994 | DiSanto et al. |
| 5,360,689 A | 11/1994 | Hou et al. |
| 5,372,852 A | 12/1994 | Titterington et al. |
| 5,380,362 A | 1/1995 | Schubert |
| 5,383,008 A | 1/1995 | Sheridon |
| 5,389,945 A | 2/1995 | Sheridon |
| 5,389,958 A | 2/1995 | Bui et al. |
| 5,402,145 A | 3/1995 | DiSanto et al. |
| 5,403,518 A | 4/1995 | Schubert |
| 5,411,398 A | 5/1995 | Nakanishi et al. |
| 5,411,656 A | 5/1995 | Schubert |
| 5,421,926 A | 6/1995 | Yukinobu et al. |
| 5,463,492 A | 10/1995 | Check |

| | | | | | |
|---|---|---|---|---|---|
| 5,467,107 A | 11/1995 | DiSanto et al. | 6,103,269 A | * 8/2000 | Wunderlich et al. ........ 424/450 |
| 5,471,233 A | 11/1995 | Okamoto et al. | | | |
| 5,498,674 A | 3/1996 | Hou et al. | FOREIGN PATENT DOCUMENTS | | |
| 5,502,476 A | 3/1996 | Neal et al. | EP | 0 268 877 A2 | 6/1988 |
| 5,508,068 A | 4/1996 | Nakano | EP | 0 268 877 A3 | 6/1988 |
| 5,512,162 A | 4/1996 | Sachs et al. | EP | 0 281 204 A2 | 9/1988 |
| 5,543,177 A | 8/1996 | Morrison et al. | EP | 0 325 013 A1 | 7/1989 |
| 5,543,219 A | 8/1996 | Elwakil | EP | 0 325 013 B1 | 7/1989 |
| 5,552,679 A | 9/1996 | Murasko | EP | 0 361 420 A2 | 4/1990 |
| 5,556,583 A | 9/1996 | Tashiro | EP | 0 375 005 B1 | 6/1990 |
| 5,561,443 A | 10/1996 | DiSanto et al. | EP | 0 396 937 A2 | 11/1990 |
| 5,565,885 A | 10/1996 | Tamanoi | EP | 0 404 545 A2 | 12/1990 |
| 5,573,711 A | 11/1996 | Hou et al. .................. 252/572 | EP | 0 408 105 B1 | 1/1991 |
| 5,582,700 A | 12/1996 | Bryning et al. ............. 204/450 | EP | 0 442 123 A1 | 8/1991 |
| 5,583,675 A | 12/1996 | Yamada et al. ............... 349/84 | EP | 0 443 571 A2 | 8/1991 |
| 5,597,889 A | 1/1997 | Takimoto et al. ........... 528/353 | EP | 0 525 852 A1 | 2/1993 |
| 5,604,027 A | 2/1997 | Sheridon .................... 428/323 | EP | 0 525 852 B1 | 2/1993 |
| 5,604,070 A | 2/1997 | Rao et al. ................... 430/110 | EP | 0 540 281 A2 | 5/1993 |
| 5,610,455 A | 3/1997 | Allen et al. ................. 307/400 | EP | 0 323 656 B1 | 7/1993 |
| 5,614,340 A | 3/1997 | Bugner et al. ................ 430/31 | EP | 0 721 176 A2 | 7/1996 |
| 5,627,561 A | 5/1997 | Laspina et al. ............. 345/107 | EP | 0 721 176 A3 | 7/1996 |
| 5,635,317 A | 6/1997 | Taniguchi et al. ............. 430/7 | EP | 0 778 083 A1 | 6/1997 |
| 5,638,103 A | 6/1997 | Obata et al. ................. 347/164 | GB | 1 314 906 | 4/1973 |
| 5,639,914 A | 6/1997 | Tomiyama et al. ......... 564/309 | GB | 1 465 701 | 3/1977 |
| 5,643,506 A | 7/1997 | Rourke ....................... 264/4.1 | GB | 2 044 508 A | 10/1980 |
| 5,643,673 A | 7/1997 | Hou ....................... 428/402.24 | GB | 2 292 119 A | 2/1996 |
| 5,650,247 A | 7/1997 | Taniguchi et al. ............. 430/1 | GB | 2 306 229 A | 4/1997 |
| 5,650,872 A | 7/1997 | Saxe et al. .................. 359/296 | GB | 2 324 273 A | 10/1998 |
| 5,654,367 A | 8/1997 | Takimoto et al. ........... 525/178 | JP | 53-73098 | 6/1978 |
| 5,663,224 A | 9/1997 | Emmons et al. ............ 524/188 | JP | 54111368 | 8/1979 |
| 5,672,381 A | 9/1997 | Rajan ......................... 427/198 | JP | 55096922 | 7/1980 |
| 5,673,148 A | 9/1997 | Morris et al. ............... 359/536 | JP | 60189731 | 9/1985 |
| 5,676,884 A | 10/1997 | Tiers et al. .................. 252/582 | JP | 62058222 | 3/1987 |
| 5,691,098 A | 11/1997 | Busman et al. ............. 430/158 | JP | 62231930 | 10/1987 |
| 5,693,442 A | 12/1997 | Weiss et al. .................. 430/66 | JP | 62269124 | 11/1987 |
| 5,694,224 A | 12/1997 | Tai ............................. 358/455 | JP | 62299824 | 12/1987 |
| 5,707,738 A | 1/1998 | Hou ........................... 428/402 | JP | 01086116 | 3/1989 |
| 5,707,747 A | 1/1998 | Tomiyama et al. ......... 428/457 | JP | 01086117 A | 3/1989 |
| 5,708,525 A | 1/1998 | Sheridon .................... 359/296 | JP | 01086118 A | 3/1989 |
| 5,709,976 A | 1/1998 | Malhotra .................... 430/124 | JP | 64 86116 | 3/1989 |
| 5,714,270 A | 2/1998 | Malhotra et al. ........ 428/537.5 | JP | 01142537 A | 6/1989 |
| 5,715,511 A | 2/1998 | Aslam et al. ............... 399/320 | JP | 01177517 | 7/1989 |
| 5,716,550 A | 2/1998 | Gardner et al. ............. 252/500 | JP | 01248182 A | 10/1989 |
| 5,717,283 A | 2/1998 | Biegelsen et al. .......... 313/483 | JP | 01267525 | 10/1989 |
| 5,717,514 A | 2/1998 | Sheridon .................... 359/296 | JP | 02223934 A | 9/1990 |
| 5,717,515 A | 2/1998 | Sheridon .................... 359/296 | JP | 02223935 A | 9/1990 |
| 5,725,935 A | 3/1998 | Rajan ......................... 428/195 | JP | 02223936 A | 9/1990 |
| 5,729,632 A | 3/1998 | Tai ............................. 382/237 | JP | 02284124 A | 11/1990 |
| 5,737,115 A | 4/1998 | Mackinlay et al. ......... 359/296 | JP | 02284125 A | 11/1990 |
| 5,739,801 A | 4/1998 | Sheridon ...................... 345/84 | JP | 5-61421 | 3/1993 |
| 5,745,094 A | 4/1998 | Gordon, II et al. ......... 345/107 | JP | 05165064 A | 6/1993 |
| 5,751,268 A | 5/1998 | Sheridon .................... 345/107 | JP | 05173194 A | 7/1993 |
| 5,753,763 A | 5/1998 | Rao et al. ................... 525/276 | JP | 05307197 A | 11/1993 |
| 5,754,332 A | 5/1998 | Crowley ..................... 359/296 | JP | 6089081 | 3/1994 |
| 5,759,671 A | 6/1998 | Tanaka et al. ............... 428/166 | JP | 6-202168 | 7/1994 |
| 5,760,761 A | 6/1998 | Sheridon .................... 345/107 | JP | 2551783 | 8/1996 |
| 5,767,826 A | 6/1998 | Sheridon et al. .............. 345/84 | JP | 08234176 | 9/1996 |
| 5,777,782 A | 7/1998 | Sheridon .................... 359/296 | JP | 9-6277 | 1/1997 |
| 5,783,614 A | 7/1998 | Chen et al. .................. 523/205 | JP | 9031453 A | 2/1997 |
| 5,808,783 A | 9/1998 | Crowley ..................... 359/296 | JP | 9-185087 | 7/1997 |
| 5,825,529 A | 10/1998 | Crowley ..................... 359/296 | JP | 9-211499 | 8/1997 |
| 5,828,432 A | 10/1998 | Shashidhar et al. ......... 349/139 | JP | 09230391 | 9/1997 |
| 5,843,259 A | 12/1998 | Narang et al. .............. 156/151 | JP | 10-48673 | 2/1998 |
| 5,900,858 A | 5/1999 | Richley ...................... 345/107 | JP | 10072571 A | 3/1998 |
| 5,914,806 A | 6/1999 | Gordon, II et al. ......... 359/296 | JP | 10-149118 A | 6/1998 |
| 5,930,026 A | 7/1999 | Jacobson et al. ........... 359/296 | JP | 10-161161 | 6/1998 |
| 5,961,804 A | 10/1999 | Jacobson et al. ........... 204/606 | JP | 11212499 | 8/1999 |
| 5,993,850 A | * 11/1999 | Sankaram et al. ........... 264/4.1 | JP | 11219135 | 8/1999 |
| 5,993,851 A | * 11/1999 | Foldvari ..................... 424/450 | JP | 11237851 | 8/1999 |
| 6,014,247 A | 1/2000 | Winter et al. ............... 359/296 | WO | WO 82/02961 | 9/1982 |
| 6,097,531 A | * 8/2000 | Sheridon .................... 359/296 | WO | WO 92/17873 | 10/1992 |

| | | |
|---|---|---|
| WO | WO 93/07000 | 4/1993 |
| WO | WO 94/24236 | 10/1994 |
| WO | WO 95/02636 | 1/1995 |
| WO | WO 95/05622 | 2/1995 |
| WO | WO 95/15363 | 6/1995 |
| WO | WO 95/19227 | 7/1995 |
| WO | WO 95/27924 | 10/1995 |
| WO | WO 95/33085 | 12/1995 |
| WO | WO 97/04398 | 2/1997 |
| WO | WO 97/24715 | 7/1997 |
| WO | WO 97/24907 | 7/1997 |
| WO | WO 98/03896 | 1/1998 |
| WO | WO 98/19208 | 5/1998 |
| WO | WO 98/41898 | 9/1998 |
| WO | WO 98/41899 | 9/1998 |
| WO | WO 9/58383 | 12/1998 |
| WO | WO 99/03626 | 1/1999 |
| WO | WO 99/10767 | 3/1999 |
| WO | WO 99/10768 | 3/1999 |
| WO | WO 99/12170 | 3/1999 |
| WO | WO 99/26419 | 5/1999 |
| WO | WO 99/47970 | 9/1999 |
| WO | WO 99/56171 | 11/1999 |
| WO | WO 99/65011 | 12/1999 |
| WO | WO 99/65012 | 12/1999 |
| WO | WO 00/10048 | 2/2000 |

OTHER PUBLICATIONS

Berglund et al. (1973), "Generation of Monodisperse Aerosol Strandards," *Environmental Science & Technology,* vol. 7, No. 1, pp. 147–153.

Blazo, (1982) "10.1/9:00 A.M.: High Resolution Electrophoretic Display with Photoconductor Addressing," *SID 82 Digest,* pp. 92–93.

Bohnke et al., (Dec. 1991) "Polymer–Based Solid Electrochronic Cell for Matrix–Addressable Display Devices," *J. Electrochem Soc.,* vol. 138, No. 12, pp. 3612–3617.

Brenn et al. (1997), "A New Apparatus for the Production of Monodisperse Sprays at High Flow Rates", Chemical Engineering Science, vol. 52, No. 2, pp. 237–244.

Brenn et al., (1996), "Monodisperse Sprays for Various Purposes—Their Production and Characteristics", *Part. Syst. Charact.,* vol. 13, pp. 179–185.

Bruce (1975), "Dependence of Ink Jet Dynamics on Fluid Characteristics," *IBM J. Res. Develop.,* pp. 258–270.

Bryce, (Sep. 1988) "Seeing Through Synthetic Metals," *Nature,* vol. 335, No. 1, pp. 12–13.

Chiang et al., (1980) "11.5/4:10 P.M.: A High Speed Electrophoretic Matrix Display," *SID 80 Digest,* pp. 114–115.

Chiang, (1977) "Conduction Mechanism of Charge Control Agents Used in Electrophoretic Display Devices," *Proceeding of the S.I.D.,* vol. 18, Nos. 3 & 4, pp. 275–282.

Chiang, (1979), "7.5/4:05 P.M.: A Stylus Writable Electrophoretic Display Device," *SID 79 Digest,* pp. 44–45.

Comiskey et al., (1997) "7.4L: Late–News Paper: Electrophoretic Ink: A Printable Display Material," *SID 97 Digest,* pp. 75–76.

Comiskey et al., (Jul. 1998) "An Electrophoretic Ink for All–Printed Reflective Electronic Displays," *Nature,* vol. 394, pp. 253–255.

Croucher et al., (1981) "Electrophoretic Display: Materials as Related to Performance," *Photographic Science and Engineering,* vol. 25, No. 2, :pp. 80–86.

Dabbousi et al., (1995) "Electroluminescence from CdSe Quantum–dot/Polymer Composites," *Applied Physics Letters,* vol. 66, No. 11, pp. 1316–1318.

Dabora (1967), "Production of Monodisperse Sprays," *The Review of Scientific Instruments,* vol. 38, No. 4, pp. 502–506.

Dalisa, (Jul. 1977) "Electrophoretic Display Technology," *Transactions on Electron Devices,* vol. 24, No. 7, pp. 827–834.

Dobson, (Feb. 1996) "Electronic Book is a Whole Library," *Sunday Times Newspaper.*

Drzaic et al. (1998), "A Printed and Rollable Bistable Electronic Display", *SID 98 Digest,* vol. 29, pp. 1131–1134.

Duthaler (1995), "Design of a Drop–On–Demand Delivery System for Molten Solder Microdrops," Submitted to the Dept, of Mech. Eng. at MIT, pp. 1–73.

Egashira et al., (1987) "A Solid Electrochromic Cell Consisting of LU–Diphthalocyanine and Lead Fluoride," *Proceedings of the SID,* vol. 28, No. 3, pp. 227–232.

Esen, et al. (1997) "Synthesis of Spherical Microcapsules by Photopolymerization in Aerosols," *Colloid Polymer Science* vol. 275, No. 2, pp. 131–137.

Fitzhenry, (1981) "Optical Properties of Electrophoretic Image Displays," *Proceedings of the SID,* vol. 22, No. 4, pp. 300–309.

Fitzhenry, (Oct. 1979) "Optical Effects of Adsorption of Dyes on Pigment Used in Electrophoretic Image Displays," *Applied Optics,* vol. 18, No. 19, pp. 3332–3337.

Flaherty (May 1999) "What Did Disappearing Ink Grow Up to Be? Electronic Ink," *The New York Times,* p. E3.

Franjione, et al. (Jun. 1995) "The Art and Science of Microencapsulation," *Technology Today.*

Ganan–Calvo (1998), "Generation of Steady Microthreads and Micron–Sized Monodisperse Sprays in Gas Streams," *The American Physical Society,* vol. 80, No. 2, pp. 285–288.

Goodman, (1976) "Passive Liquid Displays: Liquid Crystals, Electrophoretics, and Electrochromics," *Proceeding of the SID,* vol. 17, No. 1, pp. 30–38.

Guernsey, (Jun. 1999) "Beyond Neon: Electronic Ink," *New York Times,* B11, Col. 3, p. 11.

Gutcho, (1976) "Additional Uses for Encapsulated Products," *Microencapsules and Microencapsulation Techniques,* pp. 278–343.

Gutcho, (1976) "Capsule Wall Treatment," *Microcapsules and Microencapsulation Techniques,* pp. 156–177.

Gutcho, (1976) "Microencapsulation with Synthetic Polymeric Film Formers," *Microcapsules and Microencapsulation Techniques,* pp. 65–130.

Gutcho, (1976) "Pigments and Paints," *Microcapsules and Microencapsulation Techniques,* pp. 178–193.

Hatano et al., (1996) "18.3: Bistable Paper–White Display Device Using Cholesteric Liquid Crystals," *SID 96 Digest,* pp. 269–272.

Heinzel et al. (1985) "Ink–Jet–Printing", *Advances in Electronics and Electron Physics,* vol. 65, pp. 91–171.

Huang et al., (1997) "Photoluminescence and Electoluminescence of ZnS:Cu Nanocrystals in Polymeric Networks," *Applied Physics Letters,* vol. 70, No. 18, pp. 2335–2337.

Ji et al., "P–50: Polymer Walls in Higher–Polymer–Content Bistable Reflective Cholesteric Displays," *SID 96 Digest,* pp. 611–613.

Jin et al., (1992) "Optically Transparent, Electrically Conductive Composite Medium," *Science,* vol. 255, pp. 446–448.

Lee, (1977) "Fabrication of Magnetic Particles Display," *Proceeding of the SID,* vol. 18, Nos. 3 & 4, pp. 283–288.

Lewis et al. (1977) "Gravitational, Inter–Particle and Particle–Electrode Forces in the Electrophoretic Display," *Proceeding of the SID,* vol. 18, Nos. 3 & 4 pp. 235–242.

Lin et al. (1990), "Vibrating Orifice Droplet Generator for Precision Optical Studies," *Rev. Sci. Instrum,* vol. 61, No. 3, pp. 1018–1023.

Mansson (1971), "Investigation of Electrically Charged Liquid Jets," *Physica Scripta 4*, pp. 221–226.

Matsumoto et al, (1986) "Production of Monodispersed Capsules" *J. Microencapsulation*, vol. 3, No. 1, pp. 25–31.

Matsumoto et al. (1978), "Design Criteria of Hollow Cone Nozzle and Predicition of Drop Size Distribution," *Proc. Of 1st International Conference of Liquid Atomization and Spray Systems*, pp. 79–84.

Matsumoto et al. (Jun. 20–24, 1982) "Generation of Monodispersed Concentric Two Phase Droplets for Encapsulation" *ICLASS–82 Reports & Proc. 2nd Int. Conf. On Liquid Atomization & Spray Systems*, pp. 63–66.

Matsumoto, et al. (1989) "A Production Process for Uniform–Size Polymer Particles," *Journal of Chemical Engineering of Japan*, vol. 22, No. 6, pp. 691–694.

McCarthy et al. (1974), "Review of Stability of Liquid Jets and Influence of Nozzle Design," *The Chemical Engineering Journal*, vol. 7, pp. 1–20.

Mürau et al., (1979) "7.6/4:40 P.M.: An Electrophoretic RadioGraphic Device," *SID 79 Digest*, pp. 46–47.

Mürau et al., (Sep. 1978) "The Understanding and Elimination of Some Suspension Instabilities in a Electrophoretic Display," *J. Appl. Phys.*, vol. 49, No. 9, pp. 4820–4829.

Nakamura et al., (May 1998) "Development of Electrophoretic Display Using Microencapsulated Suspension," *1998 ISD International Symposium Digest of Technical Papers, vol. 29, Proceedings of SID '98 International Symposium*, pp. 1014–1017.

Negroponte et al., (Jan. 1997) "Surfaces and Displays," *Wired*, p. 212.

Orme et al. (1987), "New Technique for Producing Highly Uniform Droplet Streams Over an Extended Range of Disturbance Wavenumbers," *Rev. Sci. Instrum.*, vol. 58, pp. 279–284.

Orme et al. (1990), "The Maipulation of Capillary Stream Breakup Using Amplitude Modulated Disturbances: A Pictorial and Quantitative Representation," *Phys. Fluids*, vol. 2, No. 7, pp. 1124–1140.

Orme et al. (1993), "Droplet Patterns from Capillary Stream Breakup," *Phys. Fluids*, vol. 5, No. 1, pp. 80–90.

Ota et al., (1975) "Electrophoretic Display Devices," *Laser 75 Optoelectronics Conference Proceedings*, pp. 145–148.

Ota et al., (1977) "Developments in Electrophoretic Displays," *Proceedings of the SID*, vol. 18, Nos. 3 & 4, pp. 243–254.

Ota et al., (Jul. 1973) "Electrophoretic Image Display," *Proceedings of the IEEE*, pp. 832–836.

Pankove, (Mar. 1962) "Color Reflection Types Display Panel," *RCA Technical Notes*, No. 535, (2 sheets).

Pansu et al. (1983), "Thin Colloidal Crystals: A Series of Structural Transitions," *J. Physique*, vol. 44, pp. 531–536.

Pansu et al. (1984), "Structures of Thin Layers of Hard Spheres: High Pressure Limit," *J. Physique*, vol. 45, pp. 331–339.

Park et al., "A Device for Producing Controlled Collisions Between Pairs of Drops," *Chemical Engineering Science*, vol. 20, pp. 39–45.

Pearlstein, (1976) "Electroless Plating," *Modern Electroplating*, Lowenheim, ed., 3rd Edition, John Wiley & Sons, Inc., New York, pp. 710–747.

Peiranski et al. (1983), "Thin Colloidal Crystals," *Physical Review Letters*, vol. 50, No. 12, pp. 900–903.

Peterson, (Jun. 1998) "Rethinking Ink Printing the Pages of an Electronic Book," *Science News*, vol. 153, pp. 396–397.

Rayleigh (1879), "On the Instability of Jets," *Proc. London Math Soc.*, vol. 10, pp. 4–13.

Ridley et al., (Oct. 22, 1999) "All–Inorganic Field Effect Transistors Fabricated by Printing", *Science*, vol. 286, pp. 746–748.

Saitoh et al., (1982) "A Newly Developed Electrical Twisting Ball Display," *Proceedings of the SID*, vol. 23, No. 4, pp. 249–253.

Sankus, (May/Jun. 1979) "Electrophoretic Display Cell," *Xerox Disclosure Journal*, vol. 4, No. 3, p. 309.

Scheller et al. (1991), "Viscous Jet Breakup: Nonsinusoidal Disturbances," *Chem. Eng. Comm.*, vol. 107, pp. 35–53.

Schummer et al. (1982), "Production of Monodispersed Drops by Forced Disturbance of a Free Jet," *Ger. Chem. Eng.*, vol. 5, pp. 209–220.

Sheridon et al., (1977) "The Gyricon—A Twisting Ball Display," *Proceeding of the SID*, vol. 18, Nos. 3 & 4, pp. 289–293.

Shiffman et al., (1984) "An Electrophoretic Image Display with Internal NMOS Address Logic and Display Drivers," *Proceedings of the SID*, vol. 25, No. 2, pp. 105–115.

Shimoda et al. (1999) "Multicolor Pixel Patterning of Light–Emitting Polymers by Ink–Jet Printing," *SID 99 Digest*, vol. XXX, pp. 376–379.

Shiwa et al., (1988) "5.6: Electrophoretic Display Method Using Ionographic Technology," *SID 88 Digest*, pp. 61–62.

Singer et al., (1977) "X–Y Addressable Electrophoretic Display," *Proceeding of the SID*, vol. 18, Nos. 3 & 4, pp. 255–266.

Slocum (1992), "Kinematic Coupling Design," *Precision Machine Design*, pp. 401–412.

Tjahjadi et al. (1992), Satellite and Subsatellite Formation in Capillary Breakup, *The Journal of Fluid Mechanics*, vol. 243, pp. 297–317.

Van Winkle et al. (1986), "Layering Transitions in Colloidal Crystals as Observed by Diffraction and Direct–Lattice Imaging", *Physical Review*, vol. 34, No. 1, pp. 562–573.

Vance, (1977) "Optical Characteristics of Electrophoretic Displays," *Proceeding of the SID*, vol. 18, Nos. 3 & 4, pp. 267–274.

Vandegaer (1974) "Microencapsulation: Processes and Applications," American Chemical Society Symposium, (published by Plenum Press, New York), pp. 1–180.

Vaz et al., (Jun. 1989) "Dual Frequency Addressing of Polymer–Dispersed Liquid–Crystal Films," *J. Appl. Phys.*, vol. 65, No. 12, pp. 5043–5050.

White (1997), "Excerpts from Fluid Mechanics," *Fluid Mechanics*, pp. 351–356.

White, (1981) "An Electrophoretic Bar Graph Display," *Proceedings of the SID*, vol. 22, No. 3, pp. 173–180.

Wilmsen (1999), "Electronic Ink Signs Debuts at J.C. Penney Stores", *Boston Herald*, pp. 27.

Yamaguchi et al., (1991) "Equivalent Circuit of Ion Projection–Driven Electrophoretic Display," *IEICE Transactions*, vol. 74, No. 12, pp. 4152–4156.

Yang et al., (Nov. 1994) "A New Architecture for Polymer Transistors," *Nature*, vol. 372, pp. 344–346.

Zollinger, (1991) "Structures of Simple Di–and Triarylmethine Dyes," *Color Chemistry Synthesis, Properties and Applications of Organic Dyes and Pigments*, 2nd, Rev. Edition, pp. 71–75.

Zurer, (Jul. 1998) "Digital Ink Brings Electronic Books Closer," *Chemical*, pp. 12–13.

* cited by examiner

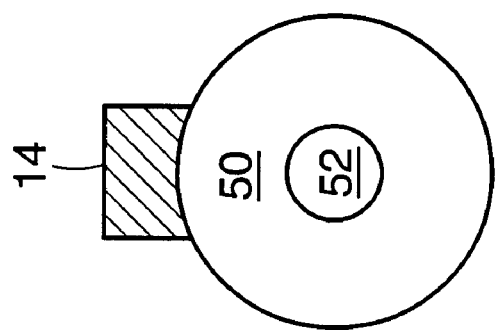
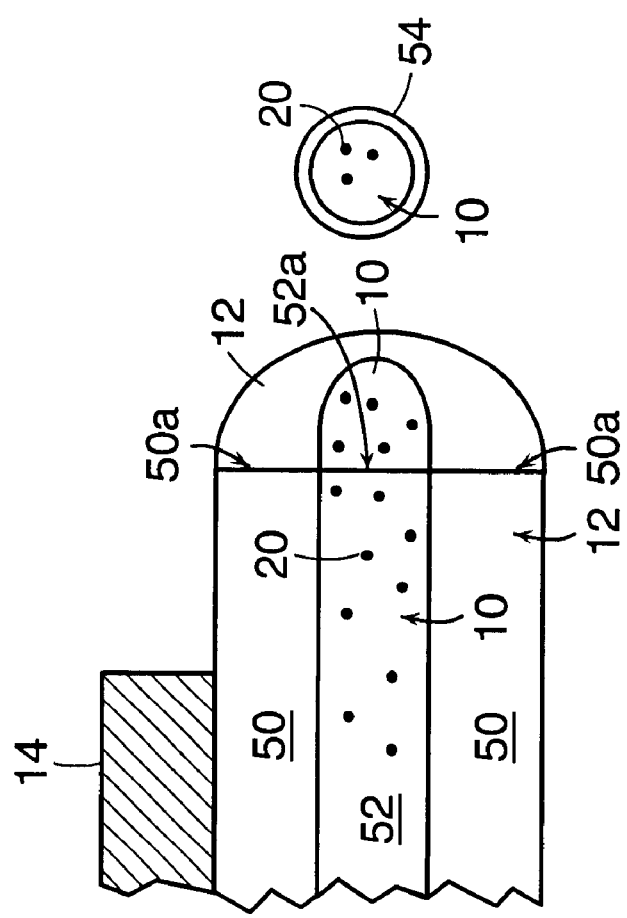
FIG. 5A
FIG. 5B

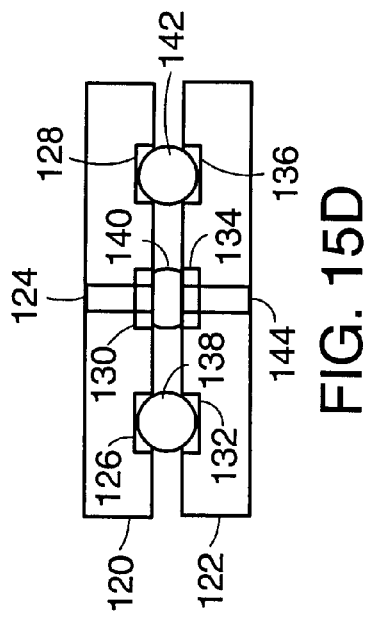
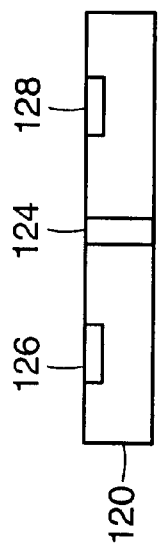
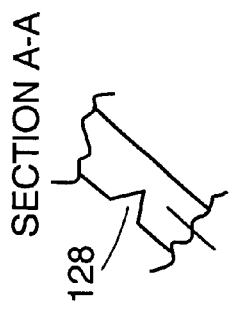
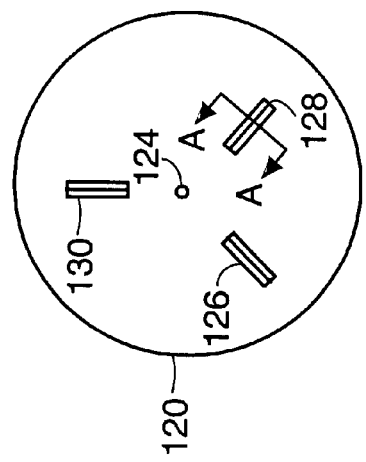

METHODS FOR PRODUCING DROPLETS FOR USE IN CAPSULE-BASED ELECTROPHORETIC DISPLAYS

Cross-Reference to Related Applications

This application is a continuation-in-part of U.S. Ser. No. 09/413,009, filed Oct. 6, 1999, now U.S. Pat. No. 6,262,833, the disclosure of which is incorporated herein by reference. This application also claims priority to and the benefit of U.S. Ser. No. 60/127,964, filed Apr. 6, 1999, the disclosure of which is incorporated herein by reference.

TECHNICAL FIELD

The invention generally relates to methods for producing large quantities of substantially monodisperse droplets for use in capsule-based electrophoretic displays. More particularly, the methods relate to producing substantially uniformly-sized droplets of a first phase, the first phase including a fluid and particles, for introduction into a second phase, or the methods relate to producing substantially uniformly-sized complex droplets having a core formed from a first phase, the first phase including a fluid and particles, and a second phase that surrounds the first phase as a shell.

BACKGROUND INFORMATION

Traditional emulsification methods are not ideally suited for forming capsules to be used in electrophoretic displays. Current methods produce disperse phase droplets that are smaller than the desired size range. For example, while some systems produce droplets as large as tens of micrometers in diameter, typical droplets are of the order of 0.01 $\mu$m to 1 $\mu$m. Furthermore, many traditional emulsification techniques result in polydisperse emulsions, i.e., emulsions that are not characterized by a narrow drop size distribution. Thus, a need exists to produce substantially uniformly-sized droplets for forming capsules to be used in electrophoretic displays.

SUMMARY OF THE INVENTION

Methods of the invention can produce large quantities of substantially uniformly-sized droplets or complex droplets for forming capsules useful for electrophoretic displays. Moreover, methods of the invention can produce a group of substantially uniformly-sized droplets from a first phase containing both a fluid and plurality of particles. These droplets are applied to a second phase. Once in contact with the second phase, any of a variety of steps can be performed, including encapsulating the droplets. Alternatively, methods of the invention can produce a group of substantially uniformly-sized complex droplets for forming capsules useful for forming electrophoretic displays. The complex droplets are formed from a first phase, containing both a fluid and a plurality of particles, at their core and a second phase that surrounds the first phase as a shell. Typically, the core of the complex droplet also is a substantially uniformly-sized droplet relative to the other cores in the group of complex droplets.

In one aspect of the invention, a method for forming substantially uniform droplets includes the steps of providing a non-aqueous internal phase; providing an external phase; vibrating the internal phase; and applying the internal phase to the external phase. The internal phase includes a plurality of particles suspended in a first fluid; the external phase includes a second fluid; and a series of droplets of substantially uniform size are formed. The droplets can be formed from the internal phase, or the droplets can be formed from both the internal and external phases.

This aspect of the invention can have any of the following features. The first fluid can be an oil. The second fluid can be an aqueous solution. The step of applying the internal phase to the external phase can include having the internal phase contained within a structure and pressurizing the internal phase so that the internal phase issues from the structure into the external phase. During the step of applying described above, the internal phase can issue through at least one aperture; can issue in at least one train of droplets; and/or can be applied to the external phase at a plurality of locations. A droplet can have a diameter of about 20 $\mu$m to about 300 $\mu$m and can have a substantially uniform size relative to other droplets in the series of droplets. The step of vibrating the internal phase can include vibrating the internal phase with a vibrating member. The vibrating member can be a piezoelectric transducer. Alternatively, an electro-mechanical or magnetostrictive or other similar vibrating member can be used. The step of vibrating the internal phase can include vibrating a conduit containing the internal phase and/or the internal phase can issue from the conduit in two or more trains of droplets, and/or a tip of the conduit, through which the internal phase issues into the external phase, can be in communication with the external phase. The step of applying the internal phase to the external phase can include simultaneously issuing the internal phase and the external phase through two adjacent channels. These two adjacent channels can terminate at two concentric nozzles. The method can further include the step of mixing the particles with the first fluid. Mixing can be accomplished by inducing a flow within the internal phase.

In another aspect of the invention, a method for forming substantially uniform droplets includes the steps of providing a non-aqueous internal phase; providing an external phase; and applying the internal phase to the external phase through an aperture in a container. The internal phase includes a plurality of particles suspended in a first fluid and the external phase includes a second fluid. The internal phase is moved relative to the external phase such that as the internal phase contacts the external phase a droplet separates from a remainder of the internal phase and such that a series of droplets of substantially uniform size is formed. This aspect of the invention can further include the step of vibrating the internal phase.

In another aspect of the invention, a method for forming substantially uniform droplets includes the steps of providing a non-aqueous internal phase; providing an external phase; and applying the internal phase to the external phase. The internal phase includes a plurality of particles suspended in a first fluid; the external phase includes a second fluid; the internal phase is pressurized and pulsed through a valve such that the internal phase forms a series of droplets of substantially uniform size.

BRIEF DESCRIPTION OF THE DRAWINGS

The invention is more particularly described in the following detailed description, drawings, and claims. In the drawings, like reference characters generally refer to the same parts throughout the different views. Also, the drawings are not necessarily to scale, emphasis instead generally being placed upon illustrating principles of the invention.

FIG. 5A depicts a schematic sectional view of two concentric nozzles forming adjacent channels.

FIG. 5B depicts a schematic end-on view of the nozzles of FIG. 5A.

FIG. 15A shows a schematic top view of a plate for kinematic alignment.

FIG. 15B shows a schematic section along line A—A through the plate shown in FIG. 15A.

FIG. 15C shows a schematic side sectional view of the plate of FIG. 15A.

FIG. 15D shows a schematic side sectional view of the plate of FIG. 15A aligned with a second plate.

DESCRIPTION OF THE INVENTION

Figure 1:
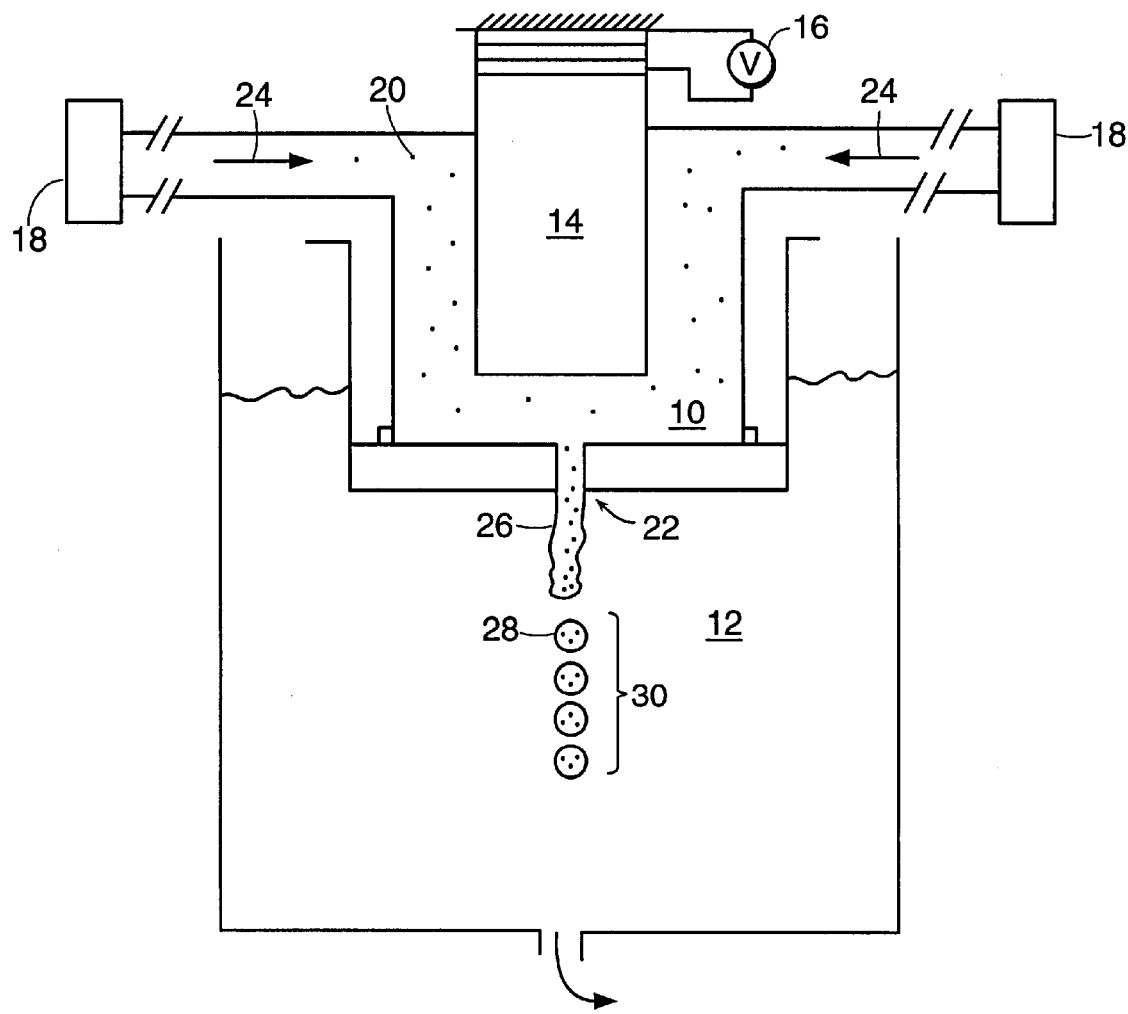
FIG. 1 depicts a schematic drawing of a device including a piezoelectric transducer that is driven at a particular frequency to impart vibration to a jet of an internal phase to produce a train of monodisperse droplets of the phase.

The invention relates to the application of a liquid dispersion (oil-based or aqueous and hereinafter referred to as the "internal phase") to another liquid (aqueous or oil-based and hereinafter referred to as the "external phase"). Generally, the internal phase is non-aqueous, contains particles, and is issued from a structure containing the internal phase such that substantially uniform droplets or substantially uniform complex droplets are produced. When the internal phase issues from the structure, it is either applied simultaneously to the external phase or applied to the external phase at a different time from issuance. In certain embodiments, when the internal phase is issued into an external phase, the liquid dispersion of the internal phase is emulsified in the external phase. This emulsification technique, for example, can be used to form a series of substantially uniformly-sized droplets of the internal phase for encapsulation by components in the external phase to produce capsules for electrophoretic displays. In other embodiments, when the internal and external phases are issued simultaneously through adjacent, concentric nozzles, a series substantially uniformly-sized complex droplets (droplets with an internal phase core and a thin external phase shell) are produced. These complex droplets also can be encapsulated by hardening the external phase shell. Typically, the cores of these complex droplets also are substantially uniformly sized. Thus, methods of the invention contribute to the progression of capsule-based electrophoretic display technology toward high through-put high quality capsule production.

I. Electrophoretic Displays

Taking a step back, electrophoretic displays have been the subject of intense research and development for a number of years. Electrophoretic displays have attributes of good brightness and contrast, wide viewing angles, state bistability, and low power consumption when compared with liquid crystal displays. Nevertheless, problems with the long-term image quality of these displays have prevented their widespread usage. For example, particles that make up such displays tend to cluster and settle, resulting in inadequate service-life for these displays.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing; and other similar techniques. Thus, the resulting display can be flexible. Further, because the display media can be printed (using a variety of methods), the display itself can be made inexpensively.

In broad overview, encapsulated electrophoretic displays provide a flexible, reflective display that can be manufactured easily and consumes little power (or no power in the case of bistable displays in certain states). Such displays, therefore, can be incorporated into a variety of applications. The display can be formed from and can include particles that move in response to an electric charge. This mode of operation is typical in the field of electrophoretic displays. A display in which the particles, ordered by an electric charge, take on a certain configuration can take on many forms. Once the electric field is removed, the optical state of the particles can be generally stable (e.g., bistable). Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

II. Production of Substantially Uniformly-Sized Droplets, Complex Droplets, and/or Capsules The present invention provides materials and methods for producing these encapsulated displays, particularly by facilitating production of capsules through production of substantially uniformly-sized droplets or complex droplets. In certain embodiments the internal phase ejects into the external phase in a stream, and, due to various physical reasons, disintegrates into a train of droplets. In other embodiments, the internal phase and external phase are coextruded through adjacent, concentric nozzles, and the compound jet disintegrates into a train of complex droplets. As used herein, "train" refers to any group of two or more droplets (or complex droplets), without regard to their location to each other. Often a train of droplets (or complex droplets) is a group of droplets (or complex droplets) organized substantially along a line. However, a train of droplets (or complex droplets) need not have this orientation.

Typically, methods of the invention produce emulsions of internal phase droplets, the droplets characterized by a narrow size distribution or produce complex droplets with an internal phase core and an external phase shell, the complex droplets characterized by a narrow size distribution. As used herein, "monodisperse" droplets (or complex droplets) refer to two or more droplets (or complex droplets) that are substantially uniformly-sized. For example, in a substantially uniformly-sized group of droplets (or complex droplets), any one droplet (or complex droplet) that has a diameter that falls within about 20%, and preferably about 5%, of the mean diameter of the group of droplets (or complex droplets) is monodisperse. Also, droplets (or complex droplets) can be made that range in diameter from about 20 $\mu$m to at least about 300 $\mu$m. These droplets (or complex droplets) can be monodisperse in relation to a particular diameter that is desired.

Several techniques have been used to produce emulsions. These techniques include mechanical mixing techniques (e.g., colloid mills, rotor or rotor/stator systems, and static (in-line mixers), other mixing techniques (e.g., ultrasonic agitation and flow of a jet of the disperse phase over a vibrating blade) homogenization techniques (e.g., ultra high-shear mechanical mixing and flow of phases under high pressure through a small aperture), and crossflow techniques (e.g., a first phase is forced through an aperture in a capillary tube or in a membrane and into a second phase such that drops of the first phase are dislodged from the aperture by a forced motion of the second phase).

Some of these techniques, such as mixing methods, generally do not produce a high yield of substantially uniformly-sized droplets (or complex droplets). Additionally, in situations such as production of capsules containing electrophoretically mobile particles, where the droplets (or the core of complex droplets) to be produced contain both a fluid and a solid (e.g., a suspending fluid and the electrophoretically mobile particles), methods that apply an internal phase containing the particles to the external phase, such as producing a disintegrating jet of one phase into another phase or coextruding one phase with another phase, face substantially different problems than the mere application of one fluid (or a combination of fluids) to a second fluid. For example, in the present invention in which the internal phase includes a fluid and particles, given the large area of liquid-solid interface present in the internal phase, the non-flowable nature of the solid in contrast to the flowable liquid, and the existence of frictional and/or shear forces as the liquid attempts to move relative to the solid particles, it is not apparent that applying the internal phase containing both a solid and a liquid to the external phase as described below should succeed. Additionally, methods, which include a step of vibrating the internal phase to produce droplets (or complex droplets), and which may depend upon the vibrational characteristics of a liquid, cannot inherently be transferred from a situation where the internal phase is a simple liquid to a situation where the internal phase is a fluid containing solids, because such characteristics are altered by the presence of a solid.

Thus, although the excitation of a jet has been used previously to produce monodisperse droplets of metal, ink, monomer, and other materials, it has not been established as a common practice for forming substantially monodisperse emulsions, particularly in situations where the jet is a phase that includes a non-aqueous fluid and particles. As such, the jet disintegration method has not been used in processes relating to manufacturing capsules employed in electrophoretic displays. Additionally, although coextrusion of two or more fluids has been used to produce monodisperse complex droplets of one fluid in association with another fluid, it also has not been established as a common practice for forming substantially uniformly-sized complex droplets, the complex droplets composed of a core that includes a non-aqueous fluid containing particles and of a shell of an external phase surrounding the core. Specific advantages of forming substantially uniformly-sized droplets composed of at least a fluid and particles, or of forming substantially uniformly-sized complex droplets composed of a core including a fluid and particles and a shell of a second fluid, include the ability to produce such droplets or complex droplets at a high rate; the ability to scale production of such droplets or complex droplets; and the ability to produce substantially uniformly-sized internal phase droplets or complex droplets having mean drop sizes ranging from about 20 µm to at least about 300 µm.

Adjustments to droplet size or complex droplet size in the various embodiments of the present invention can be made by altering the size and/or shape of the aperture through which the internal phase issues and/or the external phase issues, the pressure to which the internal phase and/or the external phase is exposed, the rotation rate of devices that rotate to produce droplets of the internal phase, and/or the frequency or amplitude at which a vibrating member is vibrated. Various systems may involve parallel plate geometry (Couette flow geometry), alternative tube flow geometry (Poiseuille flow geometry), vibrations along the axis of the jet or transverse to the jet, and dispensing from individual capillary tubes.

Referring to FIG. 1, in one embodiment, the internal phase 10 that is a fluid (such as an oil) that contains particles 20 is ejected through an aperture 22 into the external phase 12 (such as a gelatin and acacia solution). The internal phase 10 is under pressure provided by a pump 18 (or pumps) and generally travels in a direction indicated by arrows 24. The aperture 22 has a diameter ranging from about 10 µm to about 500 µm. Ejection is controlled such that the internal phase 10 forms a jet 26 that issues into the external phase 12. A vibrating member 14, such as a piezoelectric transducer, is driven at a frequency by a voltage source 16 and is used to impart a vibration to the jet 26. The jet 26 disintegrates into a train 30 of substantially monodisperse droplets 28 (only one droplet 28 is labeled) according, in part, to the frequency of the vibration. The frequency depends upon the aperture 22 size and the flow rate of the internal phase 10. This system has a large throughput. For example, at least about 300 ml/hr of about 250 µm diameter internal phase droplets can be processed. Furthermore, this embodiment can be scaled up and is suited to continuous manufacturing processes.

Figure 10:
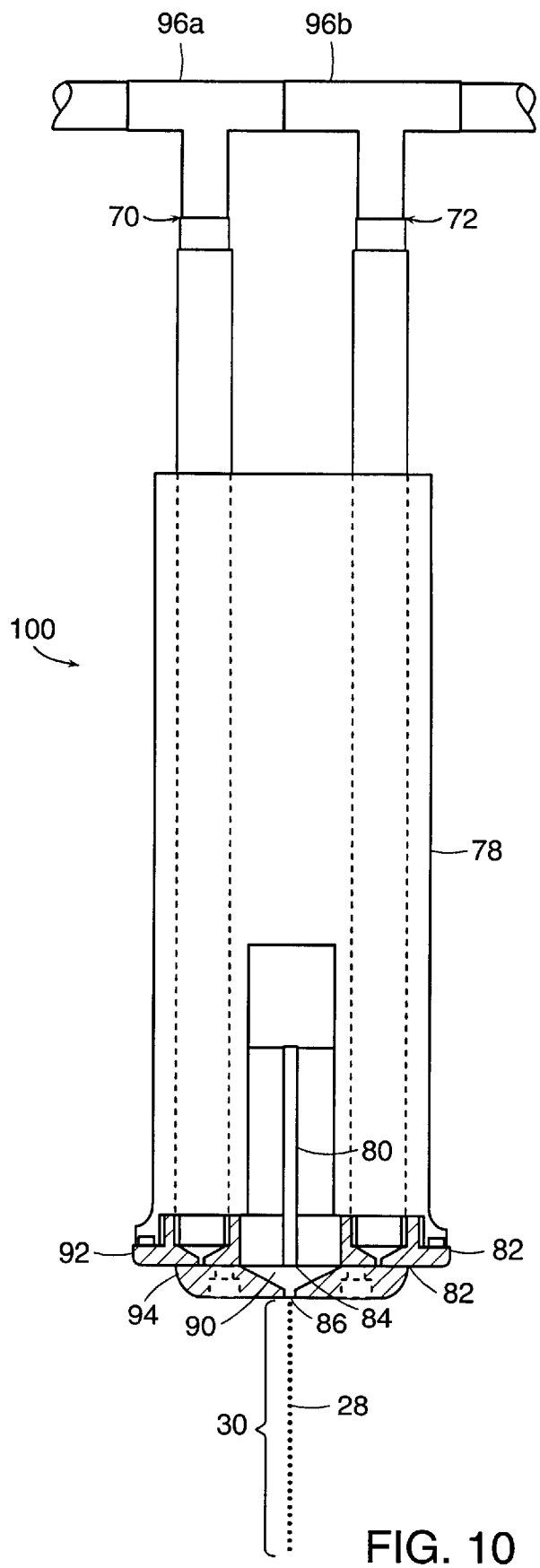
FIG. 10 depicts a schematic sectional side view of an apparatus to produce substantially uniformly sized droplets of an internal phase with a vibrating member.
Figure 11:
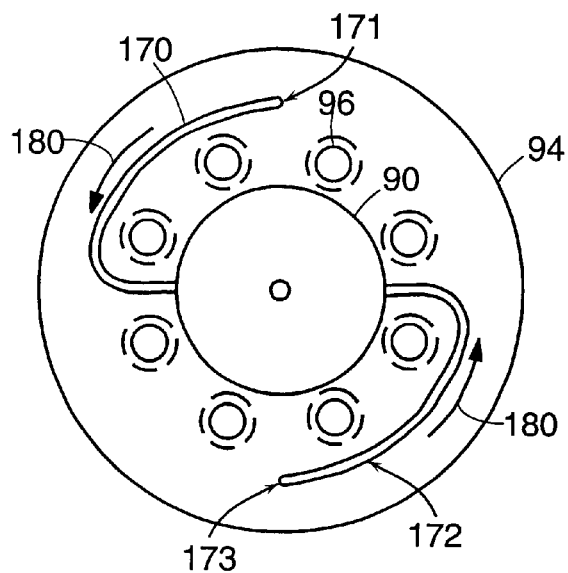
FIG. 11 depicts a top sectional view taken generally along the line of a diaphragm of the embodiment of FIG. 10 showing curved channels to promote mixing of the internal phase as it is delivered to an ejection chamber.
Figure 12:
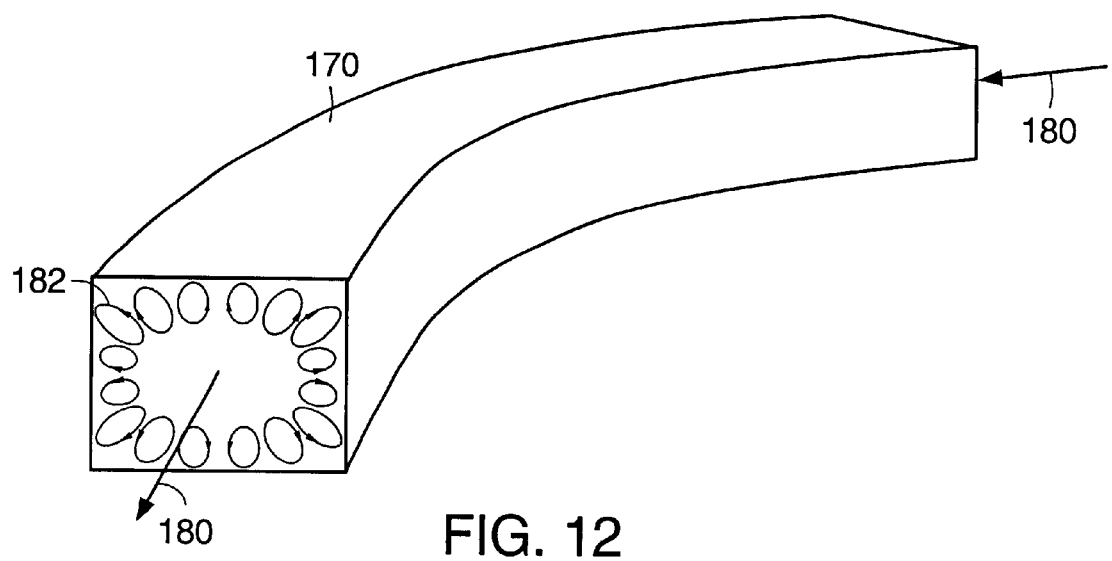
FIG. 12 depicts a schematic enlarged view of a cross-section of one curved channel of FIG. 11.

Now referring to FIGS. 10–12, another embodiment of the invention, similar in function to that shown in FIG. 1, vibrates and ejects an internal phase to form substantially uniformly sized droplets. Two tubes 70, 72 enter a sheath 78 that surrounds the apparatus 100 to allow the apparatus 100 to be submerged in an external phase while keeping the components within the apparatus 100 dry. The tubes 70, 72 screw into an upper plate 92. However, the tubes 70, 72 can be connected with the upper plate 92 in other manners, such as bonding. The tubes 70, 72 align with apertures in the upper plate 92. A diaphragm 84 is located between the upper plate 92 and a lower plate 94. The apertures in the upper plate 92 align with apertures in the diaphragm 84 and align with the ends 171, 173 of two channels 170, 172 that are formed in the top surface of the lower plate 94. The diaphragm 84 encloses the channels 170, 172 by covering their tops at the top surface of the lower plate 92. The channels 170, 172 lead to an ejection chamber 90 and an aperture 86 (which can have a particular shape) leading out of the apparatus 100. The ejection chamber 90 tapers from a large diameter circle to a smaller diameter circle as one moves from the diaphragm 84 to the aperture 86. Screws 96 (only one is labeled) are positioned such that they are located adjacent to the channels 170, 172 and the ejection chamber 90 to clamp the upper 92 and lower 94 plates together. The position of the screws 96 allows for a tight seal between the plates 92, 94 without the use of seals such as "O-rings." The plates 92, 94 are typically constructed from a metal so that the screws' 96 clamping force creates a metal face seal. The aperture 86 can be constructed separately from the lower plate 92 and subsequently affixed to the lower plate 92 where the ejection chamber 90 terminates. Alternatively, the aperture 86 can be constructed directly in the lower plate 92. A vibrating member 80, such as a piezoelectric transducer, facilitates ejection of an internal phase into an external phase in a train 30 of substantially uniformly-sized droplets 28. The vibrating member 80 is mounted on a carriage, and a diaphragm 84 transmits vibration from the vibrating member 80 to the internal phase located in the ejection chamber 90. The lower plate 94, diaphragm 84, and upper plate 92 are sealed 82, and the upper plate 92 and the sheath 78 are sealed 82.

In operation, the apparatus 100 initially is primed so that the internal phase fills the components of the apparatus 100 such that the apparatus 100 is substantially free from air bubbles. The apparatus 100 is primed by flushing the internal phase from a pressurized reservoir, through a three-way valve 96a, the inlet tube 70, the channels 170, 172 and ejection chamber 90, the outlet tube 72, and a second three-way valve 96b to exhaust the internal phase. After flushing the system to substantially remove air from the system, the function of the outlet tube 72 is switched by adjusting three-way external valves 96a, 96b so that internal phase flows to the outlet tube 72 through the three-way valve 96b, causing the outlet tube 72 to act as an inlet. Thus, once the system is primed, the internal phase enters into the apparatus 100 through both the inlet tube 70 and the outlet tube 72 (now acting as a second inlet tube).

The internal phase is stored in and moves from a pressurized reservoir. The reservoir should be stirred or otherwise mixed to prevent the particles within the internal phase dispersion from settling under gravity. Typically, the internal phase can be agitated by mechanical stirring and/or sonication. Mechanical stirring is useful, for example, for mixing the internal phase down to the smallest length scales of turbulent flow and sonication is useful, for example, for breaking up agglomerations of particles on an even smaller scale. Thus, mixing can agitate materials of a certain size down to a lower bound that is determined by the size limit of turbulent flow properties. At least below this lower bound of size (and perhaps above this bound), sonication can agitate materials that are of this size that is less than the lower bound. Additionally, the particles in the internal phase can be designed such that their chemical composition aids in keeping them separated from each other. For example, the particles can be constructed to exhibit stearic repulsion between particles.

From the reservoir, the internal phase flows to the slender inlet/outlet tubes 70, 72 of the emulsification system. The internal phase passes down the inlet/outlet tubes 70, 72, into the beginnings 171, 173 of the channels that are aligned with the inlet/outlet tubes 70, 72, and through the curved channels 170, 172 (in a direction indicated by arrows 180). In this embodiment, the channels 170, 172 are machined into the surface of the lower plate 94 (best shown in FIG. 11). The geometry of each channel 170, 172 is chosen to encourage further mixing of the internal phase. For example, flow through a curved channel induces a secondary flow that mixes the fluid(s) and particle(s) in the internal phase. In FIG. 12, this secondary flow is shown schematically as a plurality of continuous loop arrows 182 (only one is labeled) in an enlarged schematic view of one of the curved channels 170. Thus, the curved channels 170, 172 are used to maximize turbulent mixing in order to maintain the compositional uniformity of the internal phase, a flowing dispersion of one or more fluids and one or more species of particles. To ensure that the flow in the channels 170, 172 is turbulent, the Reynold's number should be larger than, for example, about 2000. The Reynold's number is defined as:

$$Re = (\rho U L)/\eta$$

where $\rho$ is the internal phase dispersion density, U is the mean velocity of the dispersion in the channel, L is a characteristic dimension of the channel, such as the hydraulic diameter (the ratio of the cross sectional area $A_c$ of the channel to the wetted perimeter $P_c$ of the channel), and $\eta$ is the viscosity of the dispersion. The internal phase dispersion can exhibit non-Newtonian behavior in some situations. Application of a shear force to the internal phase (such as by pressurizing the internal phase to move it through the apparatus 100), in some instances, can cause viscosity of the internal phase to decrease relative to its viscosity when no shear force is applied. This behavior can be found in many colloidal suspensions and sufficiently loaded dispersions. If analysis indicates that the dispersion exhibits non-Newtonian behavior, then $\eta$ may be taken as an effective viscosity (i.e., the viscosity when shear force is applied) and can be calculated in accordance with standard techniques known in the field.

For example, in some internal phase dispersions useful as electrophoretic display materials, $\rho$ is about 1090 kg/m$^3$ and $\eta$ is about $2 \times 10^{-3}$ Pa·s. These values are inserted into the Reynold's number equation, above, to describe a condition for channel geometry that should be met to provide substantially complete turbulent flow of the internal phase in the channels, when the channels contain internal phase dispersions of this type. Equations 1 and 2, below, are mathematically equivalent, but mathematically transformed relative to each other. These calculations are exemplary and are not intended to be limiting.

$$Re = \frac{1090}{0.002} \frac{UA_c}{P_c} > 2000 \quad (1)$$

or $$\frac{UA_c}{P_c} > 3.7 \cdot 10^{-3} \text{ m}^2/\text{s}. \quad (2)$$

For a given channel geometry, the constraint of (1) or (2) bounds the minimum mean velocity of the internal phase in the channel. Alternatively, one may consider the required flow rate of the system as fixed, and design the channel geometry to meet the constraint of (1) or (2).

In order to maintain an uninterrupted and stable operation of the emulsification system, typically, the aperture 86 and curved channels 170, 172 should not become clogged with the solid particles in the internal phase. To avoid clogging, the diameter of an aperture 86 and the cross-sectional area of the curved channels 170, 172 should be at least about 5 times, and preferably about 10 times, the diameter of the largest solid particles in the system. Also, the shape of the aperture 86 and the curved channels 170, 172 should not change over time due to an abrading effect of the flowing internal phase. The aperture geometry may be selected from a wide variety of configurations, but it is preferable to use a smooth entrance to the aperture 86 from the ejection chamber 90 in this apparatus 100, as opposed to a sharp edge, to achieve longer aperture service-life. Smooth aperture entrances are preferable because, at high flow rates, the particles in the internal phase will gradually abrade any sharp edges, thereby modifying, as a function of service time, the aperture performance of those apertures with sharp edges. Additionally, the aperture 86 can be made from, or coated with, an abrasion-resistant material such as stainless steel or sapphire.

The apparatus 100 is operated in order to produce droplets of the internal phase containing particles that issue into an external phase. By way of comparison, two methods exist in ink jet technology to produce drops of ink, "drop-on-demand" and "continuous-jet." Conventional drop-on-demand ink jet printers are activated by sending a voltage pulse to a piezoelectric transducer, which rapidly pressurizes the fluid in a small chamber. The fluid issues forth from an aperture attached to the chamber, thus ejecting a single drop on a time scale of about 5 μs to 10 μs. After ejection, the system is allowed to re-equilibrate over a longer time scale (approximately 50 μs to 10,000 μs). The drop-on-demand method contrasts with conventional continuous-jet ink jet devices, in which a pressurized fluid is jetted from an aperture, and the vibrations of a piezoelectric transducer excite a capillary instability in the jet. However, neither of these methods is appropriate for jetting the internal phase into a stationary external phase. Drop-on-demand systems do not impart adequate momentum to the ejected drops to enable them to be injected into a viscous external phase. Continuous jet systems are inadequate because the intensity of the capillary instability is reduced substantially by the presence of the external phase. Capillary instability is the phenomenon whereby a jet of fluid issuing from an aperture becomes unstable. This phenomenon results in break up of the jet at some point more than about a few droplet diameters from the aperture through which the jet emerges. For most situations involving these continuous jet systems, in fact, shear forces, acting at the interface between the jet's surface and the external phase, overpower the forces that drive the capillary instability. Thus, the jet either does not disintegrate at all or does not disintegrate to create useful droplets. As a result, it is difficult to use either of these existing drop ejection methods to emulsify a dispersion of one or more fluids containing particles into a liquid external phase.

Figure 13:
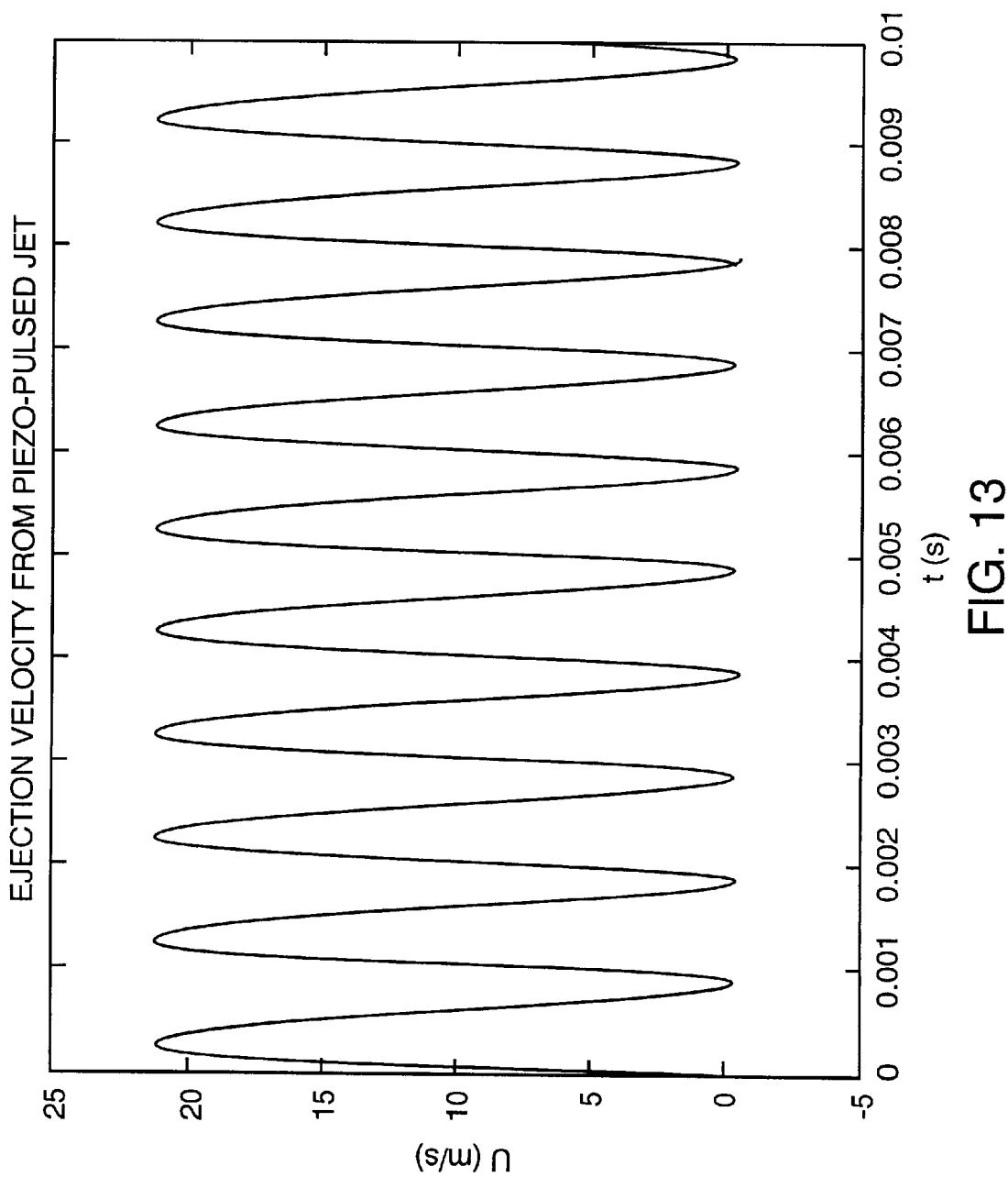
FIG. 13 shows the velocity of an internal phase expelled from the embodiment shown in FIG. 10 when the pressure of the internal phase is matched to the frequency and amplitude of the signal applied to a piezoelectric transducer when the ejection rate is about 1000 droplets/second.

To overcome this problem, the apparatus 100 employs a technique for ejecting individual drops at high speed. In the method, the internal phase is pressurized to a static pressure P, and the piezoelectric transducer 80 is oscillated by a periodic voltage signal. The pressure and the piezoelectric excitation voltage signal are selected such that the flow rate from the aperture varies in manner similar to the profile shown in FIG. 13. FIG. 13 shows the velocity ("U") of the expelled internal phase over time ("t"). The profile of FIG. 13 can occur when the pressure of the internal phase is properly matched to the frequency and amplitude of the signal applied to the piezoelectric transducer 80 and when the ejection rate is about 1000 droplets/second. In this example, ejection velocity varies transiently from about zero to about 21 m/s. This profile indicates that a slug of the internal phase, ejected from the aperture 86 at high speed, pinches-off near the aperture 86 due to the pulsatile flow imposed by the piezoelectric transducer 80. That is, the internal phase is ejected at high speed (a peak of the sinusoidal wave in FIG. 13) and pinches off when the velocity of the internal phase approaches zero (a trough of the sinusoidal wave in FIG. 13). Velocity of the internal phase is controlled by the static pressure of the system that moves the internal phase through the passageways of the apparatus 100 and the dynamic pressure of the vibrating member 80 that is superimposed on the static pressure. Thus, the dynamic pressure allows the system to oscillate between a high and low velocity. FIG. 13 is exemplary and is not meant to be limiting. Moreover, the velocity of the internal phase need not reach zero to create controlled disintegration of the jet of internal phase and the velocity of the internal phase can be considered high velocity at other values of velocity. These upper and lower values depend upon many variables such as the internal phase used. For example, it is contemplated that a decrease to even about 5 m/s from a higher velocity can create this controlled disintegration of the jet. Thus, performance of the apparatus 100 is distinct from a drop-on-demand ink jet, because it is operated in a continuous manner and typically does not re-equilibrate to an at-rest condition. Also, performance of the apparatus 100 is distinct from a continuous ink jet, because the continuous ink jet solely relies upon capillary instability of an issued jet to form individual drops. In contrast, the apparatus 100 is driven in a different manner from continuous ink jets, resulting in droplets that form within about a few droplet diameters of the aperture through which it issues. More particularly, in the apparatus 100, the internal phase is both pressurized and subjected to piezoelectric generated vibrations to create an oscillating pinching off of droplets at the aperture, while, in continuous ink jets, the vibration is tuned to enhance Rayleigh instability. Thus, the present invention combines high through-put with controlled droplet formation, and overcomes the problems with current ink-jet technology as described above.

Figure 14:
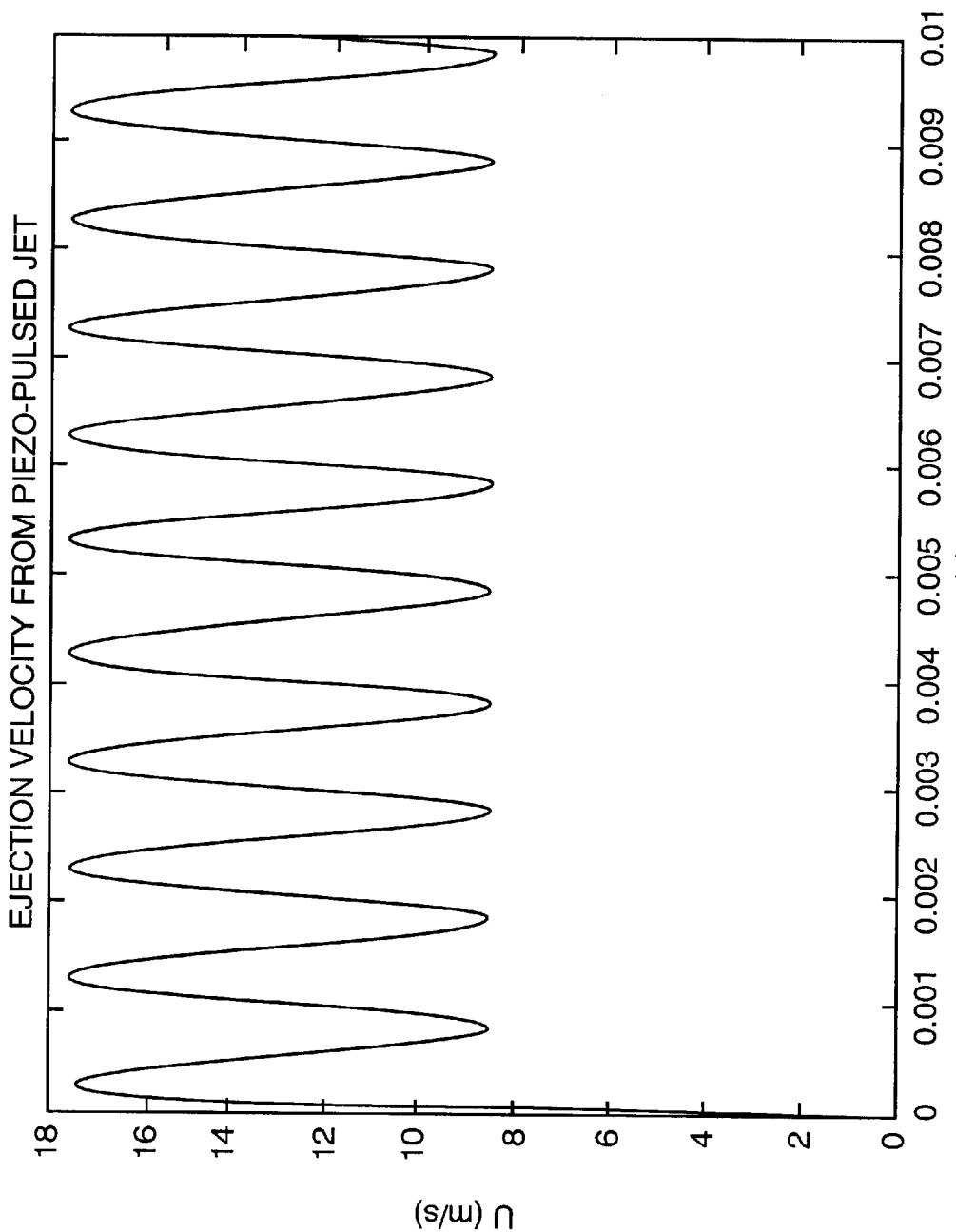
FIG. 14 shows the velocity of an internal phase expelled from the embodiment shown in FIG. 10 when the pressure of the internal phase is not ideally matched to the frequency and amplitude of the signal applied to a piezoelectric transducer when the ejection rate is about 1000 droplets/second.

If the pressure and the oscillation signal are not properly matched, the system will not function in the manner described above. Instead, a typical plot of an non-ideally matched system is shown in FIG. 14 (with expelled internal phase velocity, U, on the y-axis and time, t, on the x-axis) in which the ejection velocity varies from about 9 m/s to about 17 m/s. In this arrangement, droplet break-off does not occur at the aperture 86. Instead, a weakly pulsing, but continuous, jet of the internal phase issues from the aperture 86. This stream likely will disintegrate into droplets of a variety of sizes.

The apparatus 100 shown in FIGS. 10–12 is sensitive to a large number of design parameters and operating conditions. Some adjustable parameters include vibration of the vibrating member 80 (such as a piezoelectric transducer), the size and shape of the ejection chamber 90, the size and shape of the aperture 86, the size and shape of the channels 170, 172, and the size and thickness of the diaphragm 84.

The vibrating member 80 must be designed so that it displaces a satisfactorily large portion of the volume of the chamber 90 from which the internal phase is ejected. The maximum volumetric displacement ("$\Delta V_{max}$") of the internal phase in the ejection chamber 90 by the vibrating member 80 (via the diaphragm 84) is approximately given by:

$$\Delta V_{max} \approx \alpha V - \beta P \quad (3)$$

where $\alpha$ is a property of the vibrating member 80 and is a coefficient relating displacement to applied voltage ("V"), and $\beta$ is related to the radius of the ejection chamber and is a coefficient relating displacement to fluid pressure ("P"). Thus, at a minimum, the design in certain embodiments should comply with the equation:

$$\alpha V > \beta P \quad (4)$$

in order to provide useful operation of the apparatus 100. Thus, $\alpha V$ describes the maximum amount of volume displacement by the vibrating member 80 (and diaphragm 84) in the absence of the fluid pressure, P, and $\beta P$ describes the pressure that works opposite the pressure from the vibrating member 80. In other words, as shown in equations (3) and (4), designs of the invention must have a positive $\Delta V_{max}$ to operate (i.e., internal phase must be displaced out of the ejection chamber 90 so that the internal phase issues out of the aperture 86) and, for that to occur, the diaphragm deflection resulting from the application of voltage to the vibrating member 80 must be greater than the diaphragm deflection resulting from the static pressure of the internal phase in the ejection chamber 90.

For example, during operation of the apparatus 100, V ranges from about 50 to about 300 volts, and P ranges from about 5 to about 50 psi. However, P can be increased if the seals 82 of the apparatus 100, as well as other components of the apparatus, are sufficient to support such pressure. Accordingly, the range of P depends, in part, upon the mechanical properties of the materials used to construct the apparatus 100, and it is contemplated that this range of P values will be expanded based upon choosing materials and designs that increase the integrity of the apparatus 100 under higher pressures. High pressure operation is useful because it enables higher through-put emulsification, forming more substantially uniformly-sized droplets of internal phase per time period than the amount formed at lower operating pressures. The nominal conditions described above enable several liters of internal phase per hour to be emulsified through a single aperture unit. Adding additional apertures also can allow higher throughput operation.

Moreover, the vibration can be tuned to intentionally make two species of monodisperse droplets at the same time. The apparatus can make two types of droplets where a droplet of one type is substantially uniformly-sized relative to other droplets of that type while a droplet of a second type is substantially uniformly-sized relative to other droplets of that type. For example, the vibration can be tuned to make a group of droplets of about 300 μm and a group of smaller droplets. Thus, two sizes of substantially uniformly-sized droplets emerge from the same aperture one after the next according to a pattern (e.g., alternating large and small droplets).

Also, the ejection chamber 90 radius plays a role in determining the coefficients $\alpha$ and $\beta$. It is preferable to make the radius as large as possible to maximize the displacement of the internal phase, but for high speed operation, it is preferable to use a small radius. Thus, a balance needs to be reached to both maximize the displaced volume of the internal phase and to maximize the throughput of internal phase. For this embodiment, the radius of the chamber 90 ranges from about 1 mm to about 10 mm. However, other radii are contemplated for other embodiments of the present invention, depending upon this balance of displacement volume and speed of operation, as well as the interplay with other variables.

The length and cross-sectional area of the channels 170, 172 also are controllable variables. The channels 170, 172 can range in length from about 0.25 mm to about 15 mm, with cross-sectional areas ranging from about 20,000 μm² to about 500,000 μm². For a given flow rate, the cross-sectional area of the channels 170, 172 can be reduced to increase the Reynold's number to enhance mixing. The channels 170, 172 can be fabricated using conventional machining, chemical etching, photolithographic processes, reactive ion etching, scribing, or any other technology useful for precision machining and microfabrication. The aperture 86 can have a diameter ranging from about a few μm to about several hundred μm or more, and preferably about 25 μm to about 200 μm. These apertures can be manufactured using techniques for precision machining or microfabrication, and can be constructed separately from the lower plate 94 and later affixed to the lower plate 94 or can be constructed from the lower plate 94 itself.

The diaphragm 84 can be made from any material that is able to deflect under pressure from the vibrating member 80 and that has a suitable resiliency and stiffness (to avoid permanent deformation) during use to provide a reasonable service-life. Metals with a Young's modulus of about 0.1 GPa to about 400 GPa, preferably about 69 GPa to about 300 GPa, and polymers with a Young's modulus of about 1 GPa to about 10 GPa, preferably about 3 GPa to about 5 GPa, are useful. As the Young's modulus increases, the deflection of the diaphragm 84 under pressure from the vibrating member 80 decreases. One example of a material that is useful as the diaphragm 84 is a stainless steel foil having a thickness ranging from about several $\mu$m to about several hundred $\mu$m, and preferably about 25 $\mu$m to about 100 $\mu$m. Thinner foils are preferred, but foils that are too thin will tend to rupture or otherwise permanently deform during aggressive use. Another example of materials that are useful as the diaphragm 84 are polyimides, such as Kapton (available from E.I. du Pont de Nemours and Company, Wilmington, Del.).

The apparatus 100, described above enables substantially uniformly-sized droplets of internal phase to be ejected into an external phase. The resulting emulsion can be encapsulated to create an encapsulated electrophoretic display material, as described above. For example, complex coacervation can be used. However, a variety of encapsulation techniques can be used.

For example, encapsulation may be effected by in situ polymerization utilizing an oil/water emulsion, which is formed by dispersing the internal phase (e.g., a dielectric liquid containing a suspension of pigment particles) in the aqueous environment of the external phase. Monomers polymerize to form a polymer with higher affinity for the internal phase than for the aqueous external phase, thus condensing around the emulsified oily droplets. One example of such in situ polymerization is that between urea and formaldehyde in the aqueous external phase of the oil (internal phase)/water (external phase) emulsion in the presence of a negatively charged, carboxyl-substituted, linear hydrocarbon polyelectrolyte material, such as poly (acrylic acid). The resulting capsule wall is a urea/formaldehyde copolymer, which discretely encloses the internal phase. The capsule is clear, mechanically strong, and has good resistivity properties. Other useful cross-linking agents for use in such processes include aldehydes, especially formaldehyde, glyoxal, or glutaraldehyde; alum; zirconium salts; and poly isocyanates.

The coacervation approach also utilizes the oil/water emulsion of the internal and external phases. One or more colloids are coacervated (i.e., agglomerated) out of the aqueous external phase and deposited as shells around the oily droplets of the internal phase through control of temperature, pH and/or relative concentrations, thereby creating the capsule. Materials suitable for coacervation include gelatins and gum arabic.

The interfacial polymerization approach relies on the presence of an oil-soluble monomer in the internal phase, which once again is present as an emulsion in the aqueous external phase. The monomers in the internal phase droplets react with a monomer introduced into the aqueous external phase, polymerizing at the interface between the internal phase droplets and the surrounding aqueous external phase and forming capsule walls around the droplets. Although the resulting walls are relatively thin and may be permeable, this process does not require the elevated temperatures characteristic of some other processes, and therefore affords greater flexibility in terms of choosing the dielectric liquid.

Now referring to FIGS. 2A–2D, in another embodiment, the internal phase 10 containing a fluid and particles 20, as described above, is fed into a hollow tube 32 according to arrow 34. The tube 32 is perforated along its outer surface with a plurality of small apertures 22. The diameter of these apertures can range from about 10 $\mu$m to about 500 $\mu$m. The tube 32 is spun in direction A at a particular rate, and the forces associated with the tube 32 rotation cause the internal phase 10 to extrude out through the apertures 22 (best shown in FIG. 2B). As the internal phase 10 issues into the external phase 12, droplets 28 of the internal phase 10 break off from the remainder of the internal phase 10 due to viscous interaction between internal phase 10 and the surrounding external phase 12. Depending upon the number of apertures 22, a number of trains 30 (only one train 30 is labeled) of droplets 28 are produced (best shown in FIG. 2C). Alternatively, the external phase may be set into motion, and the perforated tube may be held at rest. As the internal phase flows out of the tube, the relative motion of the internal phase and the external phase results in a train of droplets, as described above.

Figure 2A:
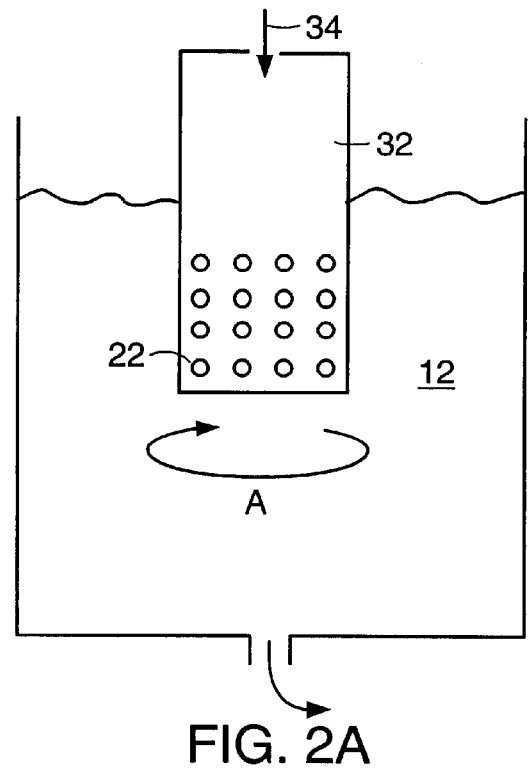
FIG. 2A depicts a schematic drawing of a device that forms droplets of an internal phase by issuing the phase through holes in a hollow tube that is spun at a particular rate.
Figure 2B:
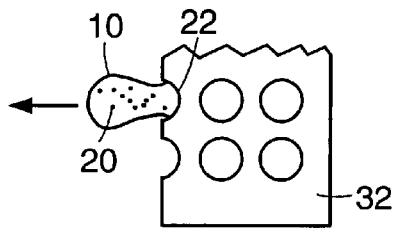
FIG. 2B depicts a schematic enlarged view of a droplet emerging from an aperture in a section of the tube of FIG. 2A.
Figure 2C:
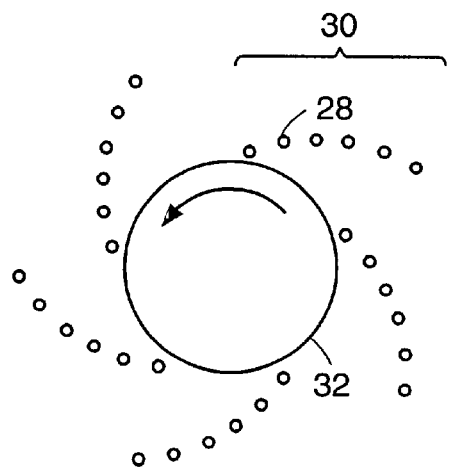
FIG. 2C depicts a schematic top view of the tube of FIG. 2A and droplets emerging from various apertures in the tube.
Figure 2D:
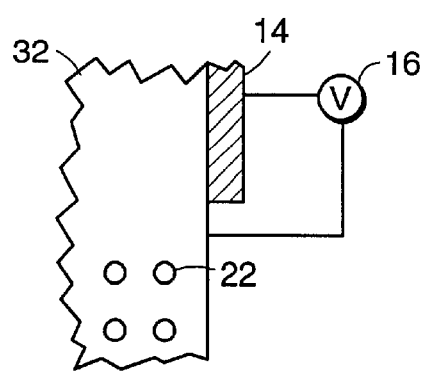
FIG. 2D depicts a schematic enlarged view of a section of an alternative embodiment of the device of FIG. 2A in which the tube is spun and vibrated.

Optionally, a vibrating member 14, such as a piezoelectric transducer, can be combined with the perforated tube 32 (FIG. 2D). The vibrating member 14 is excited, for example, with a source of voltage 16, and vibrates the internal phase to facilitate droplet production from the apertures 22. More particularly, the internal phase is forced through the perforated tube 32 such that a plurality of jets issue radially outward from the tube 32. Using the vibrating member 14, the tube 32 is excited along its centerline axis (perpendicular to the axis of the jets). Vibrations are imparted to each of the jets, simultaneously, causing them to break up into several trains of substantially uniformly-sized droplets.

The design shown in FIGS. 2A–2D offers similar advantages to those described above for FIGS. 1 and 10–14 and also offers the advantage that the rotation of the tube 32 allows fresh external phase 12 to be transported to the aperture 22 region in a continuous manner. Because it is difficult to maintain sufficient concentrations of stabilizing agents, such as sodium dodecylsulfate, very near to an aperture in many emulsification systems, the rotating tube 32 allows these stabilizing agents to be presented to regions near an aperture 22. Other similar designs can include rotating or oscillating perforated structures, such as spheres or plates, or systems that otherwise allow the external phase to flow past an aperture to replenish the local concentration of stabilizing agents.

Figure 3A:
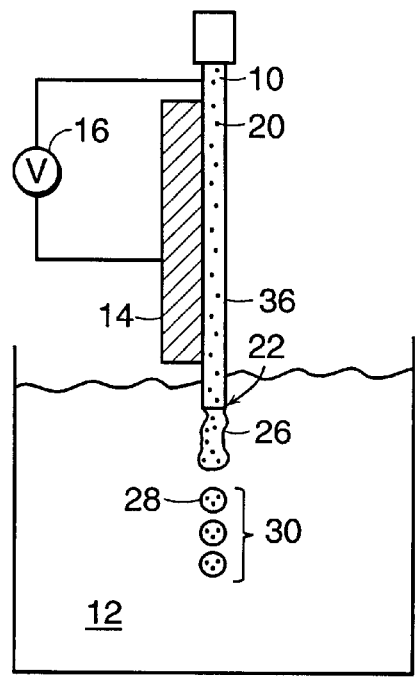
FIG. 3A depicts a schematic drawing of a device that includes a conduit and a vibrating mechanism for producing a train of droplets.
Figure 3B:
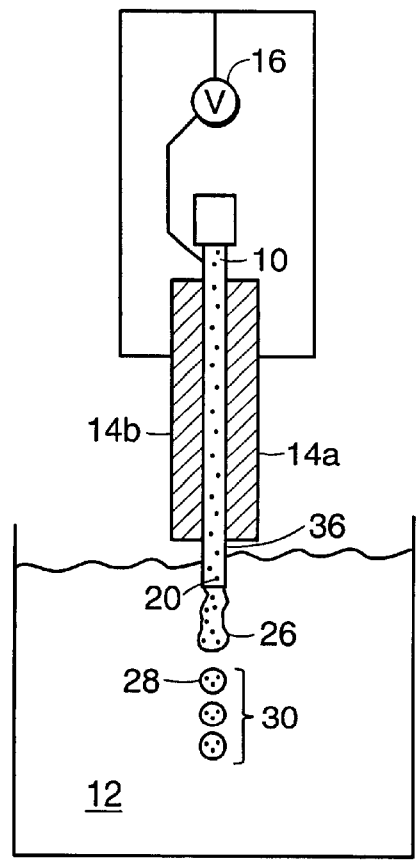
FIG. 3B depicts a schematic drawing of a device that includes a conduit and two vibrating mechanisms for producing a train of droplets.

Referring to FIGS. 3A and 3B, in another embodiment, the internal phase 10 that includes a fluid and particles 20 flows under pressure through a narrow gauge tube 36. The ejection velocity of the internal phase 10 (containing particles 20) from the tube 36 is sufficiently large that the dispersion issues from the aperture 22 at the end of the tube 36 in a jet 26. The ejection velocity is sufficiently large to induce formation of substantially uniformly-sized droplets. A vibrating member 14, such as a piezoelectric transducer, is adjacent to the side of the tube 34. The vibrating member 14 can be driven by an applied voltage from a voltage source 16 such that the tip of the narrow gauge tube 36 vibrates transversely at a particular frequency. In an alternative embodiment, two vibrating members 14a, 14b, such as piezoelectric transducers, are adjacent the tube 36. The double vibrating member 14a, 14b arrangement is configured such that the piezoelectric transducers 14a, 14b are out of phase. For example, in response to a single voltage signal, one piezoelectric expands while the other contracts. The motion results in the transverse vibration of the tip of the narrow gauge tube 36. Moreover, in certain embodiments, the vibration frequency is chosen such that it matches or nearly matches a resonant frequency of the system. Typically, the tip of the narrow gauge tube 36 is submerged below the surface of the external phase 12 before the system is operated. Some variables, such as the flow rate of internal phase 10 through the tube 36, the frequency of the vibration, and the amplitude of the vibration, can be controlled such that substantially uniformly-sized droplets 28 of internal phase 10 break off from the jet 26. These droplets 28 can form a train 30.

Figure 4A:
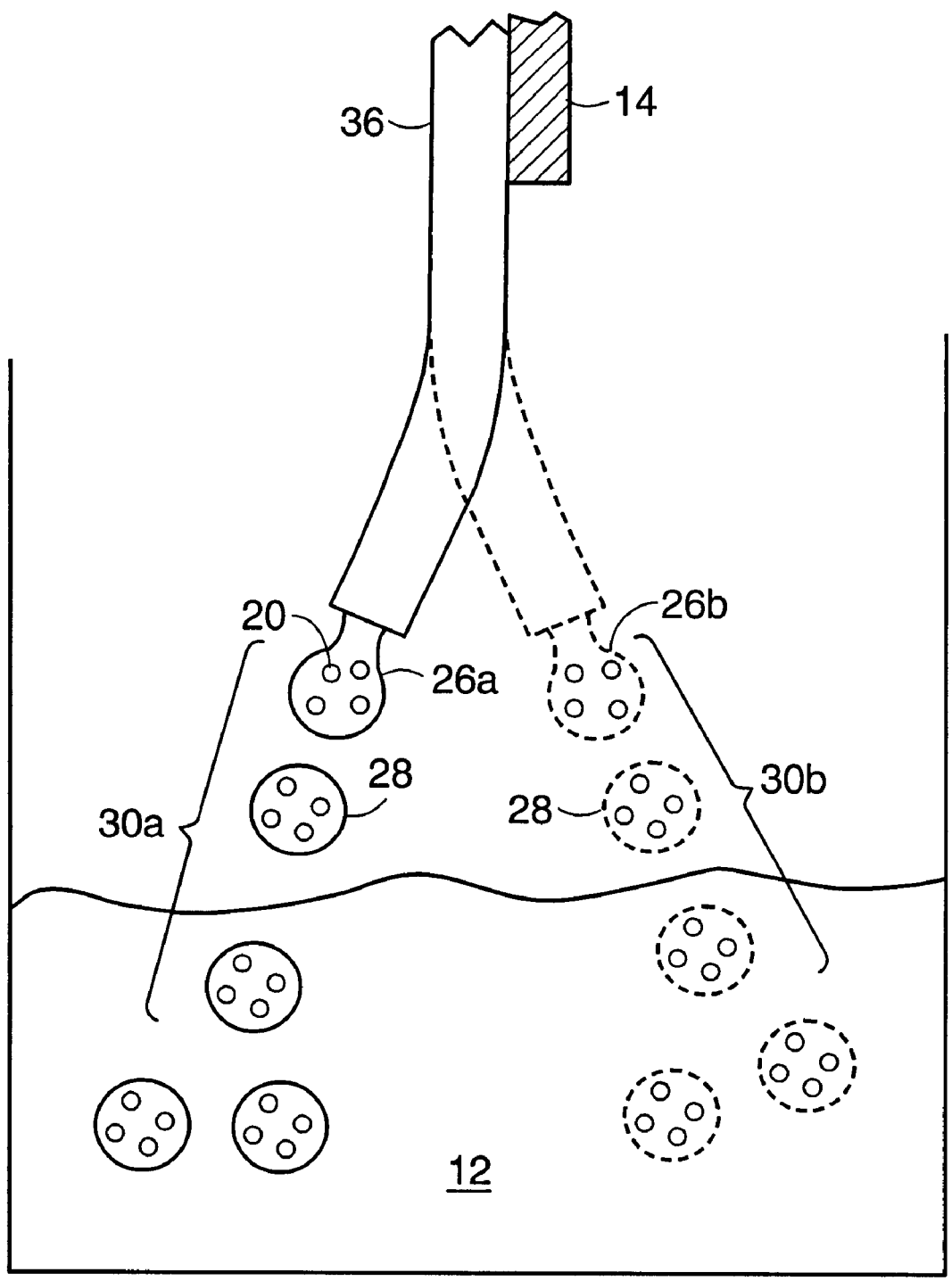
FIG. 4A depicts a schematic drawing of a device that includes a narrow gauge tube with a vibrating mechanism for producing a double jet.
Figure 4B:
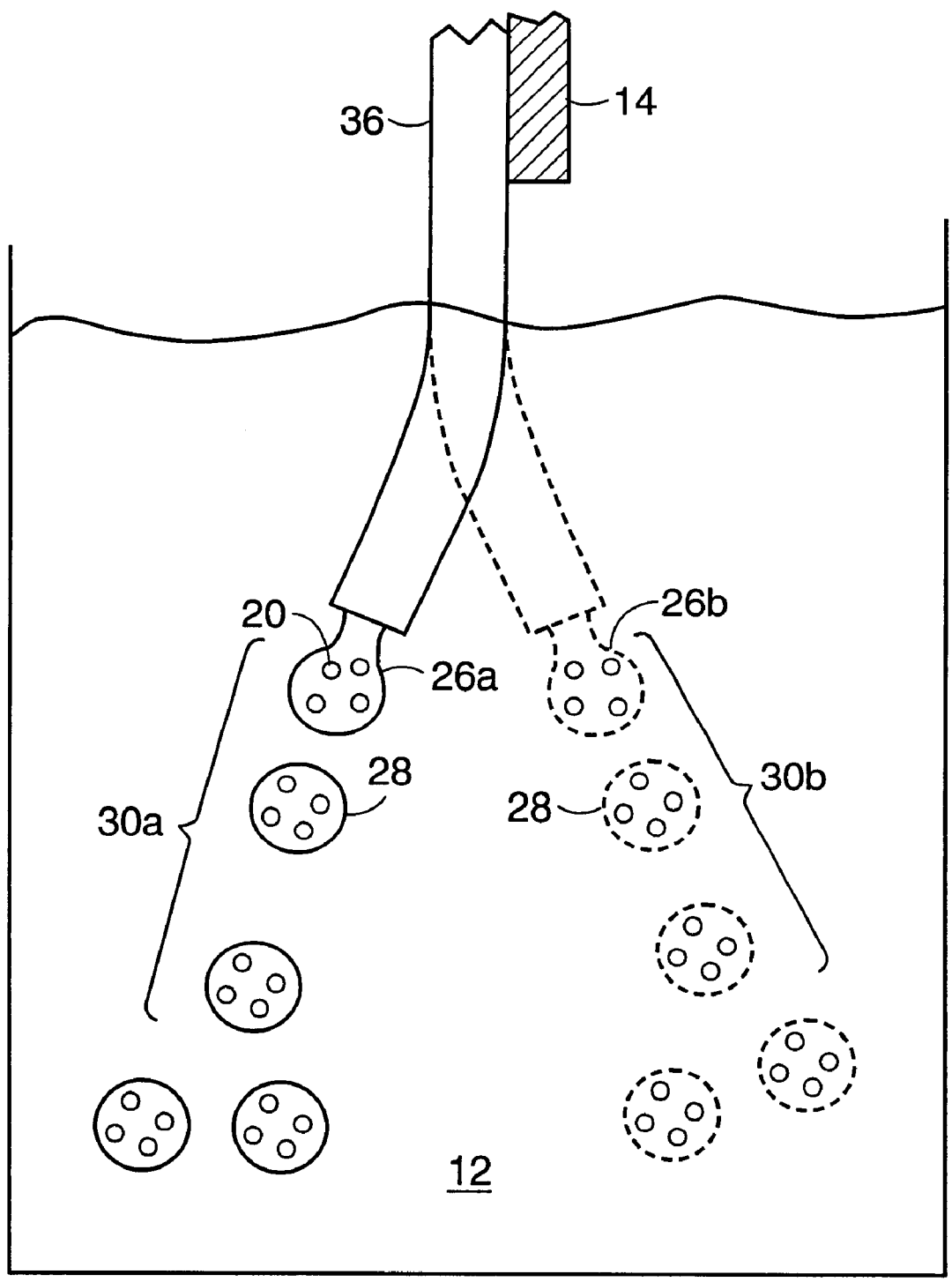
FIG. 4B depicts a schematic drawing of a device that includes a narrow gauge tube with a vibrating mechanism for producing a double jet of an internal phase and has a tip of the tube in communication with an external phase.

In certain embodiments, vibrating the tube 36 with the vibrating member 14 leads to the formation of two trains of droplets 30a, 30b from a jet in one of two positions 26a, 26b as shown in FIGS. 4A and 4B. The vibrating member 14 causes the tube 36 to bend back and forth. The tube 36 tip is shown in one position in solid lines and in a second position in broken lines, and the jets in one of two positions 26a, 26b and the droplets 28 are shown in solid or broken lines to correspond to the position of the tube 36 tip that produced them. Generally, flow of the internal phase out of the tube 36 is tuned to the vibration frequency of the tube 36. In this instance, each time the tube changes direction, a droplet breaks off of the jet at one of the positions 26a, 26b at or near the aperture through which the internal phase 10 issues. In certain embodiments, the flow rate is adjusted to emit a volume of internal phase 10, during one sweep of the tube 36, that is approximately equal to the desired droplet volume. Thus, the double jet 26a, 26b of the internal phase 10 becomes two trains 30a, 30b of droplets 28. FIGS. 4A and 4B show similar embodiments, but, In FIG. 4A, the tip of the tube 36 is above the external phase 12, and in FIG. 4B, the tip is in communication with the external phase 12.

Several variations on this system may be implemented. First, one may use any suitable means to electrically insulate the outer surfaces of the piezoelectric transducers so that the entire system may be submerged under the external phase. For example, the piezoelectric transducer can be encapsulated in a reasonably compliant epoxy such that the transducer can still vibrate. Alternatively, the apparatus can be contained in a housing through which the tube for issuing the internal phase protrudes. Second, the geometry of tube and vibrating member(s) may be altered to change the natural frequency and vibration characteristics of the system. Described above are a single vibrating member arrangement and a double, out-of-phase, vibrating member arrangement. Many other arrangements are possible such as including more vibrating members or by shifting the vibrating members up or down along the length of the tube. As the end of the vibrating member is moved further away from the tip of the tube (i.e., the aperture through which the internal phase issues), the larger the amplitude of vibration at the tip. Third, while the "double jet" arrangement has been found to give narrow droplet size distributions, narrow droplet size distributions may be obtained when any number of jets appear to issue from the aperture. Finally, the system may be multiplexed to realize considerable advantages in throughput.

Figure 6:
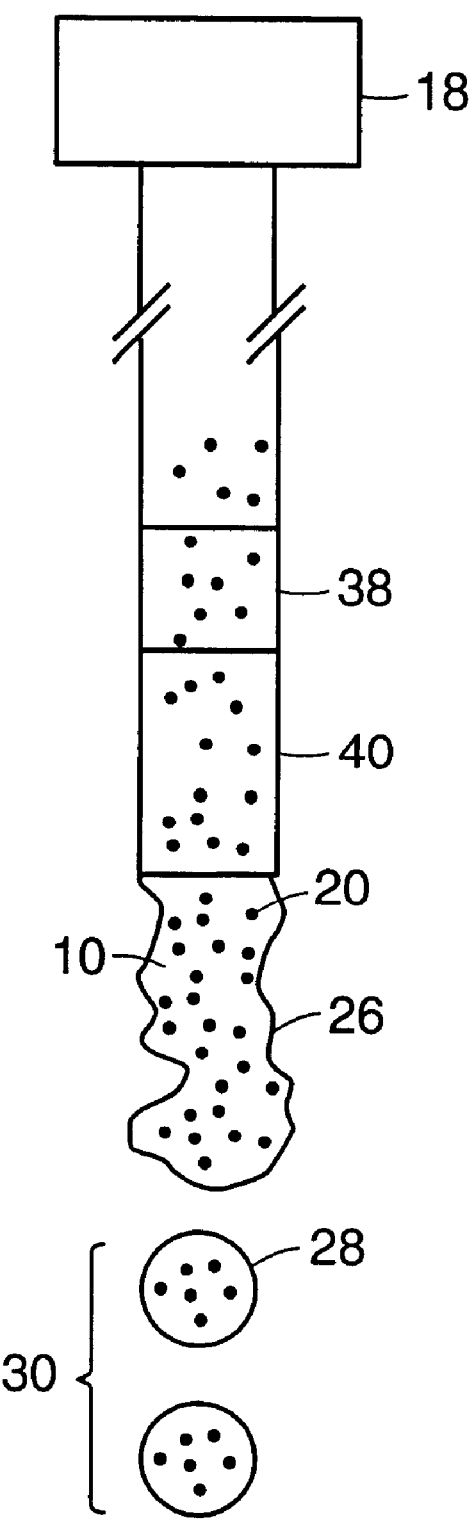
FIG. 6 depicts a schematic drawing of a device including a valve for producing droplets.

Referring to FIG. 6, in another embodiment, a high speed valve 40, such as a solenoid valve, is placed upstream of a narrow gauge tube 40 or other structure having a small aperture. The internal phase 10 is pressurized by a pump 18 so that it jets out of an aperture, and the shutter valve 38, between the aperture and the pump 18, is pulsed to restrict the flow is a pulsatile manner. The resulting droplets 28 that break off from the jet 26 of internal phase 10 are substantially uniform in size and emerge in a train 30. These droplets 28 break off from the jet 26 at or near the aperture through which the internal phase flows. This type of high speed valve is commercially available from the Lee Company (Westbrook, Conn.).

Complex droplets (and, ultimately, capsules) also can be formed from the controlled break-up of a compound fluid jet formed by coextrusion of two immiscible fluids through concentric nozzles. A fluid jet disintegrates into droplets by the growth of jet surface disturbances developed at the nozzle from which the fluid was forced. A minimum fluid flow rate is desirable in order for the jet to form. This relationship is given by the formula:

$$Q > (\pi 2)((\sigma d^3)/\rho)^{1/2}$$

where Q represents volumetric flow of a fluid through an aperture, σ represents surface tension of the fluid, d represents diameter of the aperture, and ρ represents the density of the fluid. Because jet formation requires laminar fluid flow through the aperture, the fluid velocity through a particular aperture of diameter d (and hence fluid flow rate) is bounded by the requirement that the Reynold's number, defined as:

$$Re = (\rho du)\eta$$

is less than about 2100, where Re represents the Reynold's number, u represents fluid velocity through an aperture, and η represents viscosity of the fluid. Typically, the result is that flow rates are less than about 20 ml/min for a 200 micron aperture, or less than about 7 ml/min for a 74 micron aperture.

A compound jet is produced when a jet of fluid from one aperture is extruded within a jet of another fluid so that a jet of two concentric threads of immiscible fluids is formed. For example, as shown in FIGS. 5A and 5B, an internal phase 10 containing particles 20 emerges from a center channel 52 through a nozzle 52a in a jet. Also, the external phase 12 emerges through from a second channel 50 through a nozzle 50a in a jet. The second, outer channel 50 and nozzle 50a is adjacent to, concentric with, and surrounds the inner channel 52 and nozzle 52a. Herein, nozzles and other structures through which the internal and/or external phases issue are referred to, generally, as apertures. As the jet disintegrates, complex droplets 54 form that have an external shell formed from the external phase 12. The shell of external phase 12 contains a core of the internal phase 10. Adjusting the relative flow rates of the external phase 12 and the internal phase 10 through their respective channels 50, 52 with apertures 50a, 52a is one way to control the ratio of shell thickness to core diameter of the complex droplet 54. The complex droplet's 54 shell of external phase 12 can be solidified around the core of internal phase 10 to create a capsule for use in electrophoretic display devices.

A vibrating member 14, such as a piezoelectric element, can impart vibration to the compound jet of the external 12 and internal phases 10 in order to provide one way to control then the jet disintegration. This vibration enhances production of a series of substantially uniformly-sized complex droplets with a core of the internal phase 10 and a shell of the external phase 12. Also, typically, the internal phase 10 cores of the complex droplets, in a series of complex droplets, are substantially uniformly sized. In the situation where there is no external vibration of the compound jet, the predominant disturbance of the jet leads to the "natural" fluctuation of the jet's diameter which has a wavelength equal to about 4.508×(outer aperture diameter). This disturbance eventually causes the jet to break up to give compound droplets whose diameters are about 1.89×(outer aperture diameter). Outer aperture diameter is approximately equal to the diameter of the jet. The wavelength of disturbance refers to the appearance of the jet where the walls of the jet are characterized by a sinusoidal shape.

Vibration imparted to the jet by pulsation of the vibrating member 14 physically manifests itself by effecting the frequency of the dominant disturbance on the jet surface that leads to jet break-up. If vibration having an amplitude greater than that of the natural fluctuation described above is imparted to the fluid jet, then the minimum wavelength of that vibration, that will still cause jet break-up with production of substantially uniformly-sized complex droplets, is approximately equal to the aperture circumference (i.e., about π×(outer aperture diameter)). In that instance, complex droplets are produced with about a diameter of about 1.68×(outer aperture diameter). Therefore, complex droplets and/or finished capsules are produced that have reasonably uniform diameters (equal to about double the largest aperture diameter) and have controllable wall thickness. Moreover, in order to maintain spherically concentric complex droplets and capsules, a second vibration can be imposed that is perpendicular to the direction of the flow of the compound jet. This second vibration comes from a source that is physically separated from the jet production apparatus, unlike the vibrating member 14, and serves to vibrate the compound droplets in order to maintain the concentricity of the internal phase core within the external phase shell.

Between the minimum and maximum fluid flow rates through a given aperture, complex droplet size can be controlled by adjusting the excitation frequency according to the equation:

$$D=((6Q)/(\pi f))^{1/3}$$

where D represents the diameter of complex droplets formed by disintegration of the compound jet, Q represents total volumetric flow rate through both of the apertures, and f represents the frequency of excitation (vibration) of the fluids (compound jet). For producing complex droplets of about 300 microns in diameter, at flow rates between about 1 ml/min and about 10 ml/min, through apertures having diameters ranging from about 100 μm to about 200 μm, vibration frequencies in the range about 500 to about 80,000 Hz are useful. From the above equation it is discernable that flow rate and frequency can be varied to produce the same size complex droplet from a given aperture, provided that the other liquid flow conditions are met. For example, a high flow rate and a high vibration frequency rate will produce a certain sized complex droplet while a relatively lower flow rate combined with a relatively lower vibration frequency rate will produce substantially the same sized complex droplet.

Typical capsules have a solid wall, such as a polymer. During a coextrusion process, making the complex droplets into capsules with solid capsule walls can be achieved in several ways. Six examples are discussed below. First, the external phase shell can include a solution of polymer(s) in a volatile solvent. The solvent is allowed to evaporate as the newly formed complex droplet falls from the nozzle or after collection in a suitable container. Evaporation is accomplished, for example, by reduced pressure or heat. Second, the wall can be formed from a liquid monomer in the external phase, such as cyanoacrylates (such as ethyl 2-cyanoacrylate or n-butyl 2-cyanoacrylate) or cyanomethacrylate, that polymerizes on contact with moist air. Third, the external phase can include a mixture of liquid reactive monomers, oligomers, or pre-polymers that are mixed immediately prior to their entry into the coextrusion head. Polymerization to form a solid wall occurs after the complex droplet is formed. For example, suitable wall materials include isocyanates, such as toluene diisocyanate (a monomer), that are combined with polyamines, such as 1,6-diaminohexane (a low molecular weight monomer) or polyethylene imine (a high molecular weight polymer) to form a polyurea wall. Alternatively, isocyanates, such as toluene diisocyanate, can be mixed with polyols, such as ethylene glycol, to form a polyurethane wall. Also, two-part epoxy systems, such as 1,6-diaminohexane mixed with the prepolymer formed from the reaction of epichlorohydrin and bisphenol-A, can be used to form the wall. Fourth, the external phase can include a liquid monomer, or mixtures of monomers, that can be polymerized when exposed to energy. For example, UV light can be directed onto newly formed complex droplets as they issue from the nozzles to cure the external phase shell into a capsule wall. Examples of UV light curable systems include Somos 2100, Somos 6500 (both available from DSM Somos, New Castle, Del.), and Desolite (Catalog No. D6-114) (available from DSM Desotech, Elgin, Ill.). Alternatively, heat can be used to cause thermal polymerization of the shell as the complex droplets form. Examples of heat curable systems include butyl methacrylate combined with benzoyl peroxide or low molecular weight silicone materials that cure rapidly if heated, such as Fluorogel (Catalog No. 3-679) (available from Dow Corning Corporation, Midland, Mich.). Fifth, the external phase shell can include a molten polymer that solidifies when it cools. For example, useful polymers include polyethylene-co-vinyl acetate ("EVA"), polyethylene, or low melting point Carbowax series polymers (available from Union Carbide, Danbury, Conn.). Sixth, the external phase shell can include a latex dispersion. Water is removed from the shell of the complex droplet, forming a polymer wall.

Although substantially uniformly-sized complex droplets (as well as substantially-uniformly sized cores of internal phase), that lead to substantially uniformly-sized capsules, can be formed from controlled jet disintegration, the complex droplets sometimes collide with other complex droplets in a train. This occurrence happens because the complex droplets catch up with one another. These collisions cause the complex droplet size distribution to broaden, and, in the case of capsules, cause the formation of multiple-cored capsules. Contact between complex droplets (which leads to coalescence of liquid drops) should be prevented, at least until the shells have solidified, so that neither contact during initial formation, which broadens the complex droplet size distribution, nor contact subsequent to initial formation, which causes aggregation of complex droplets, occurs.

Figure 7:
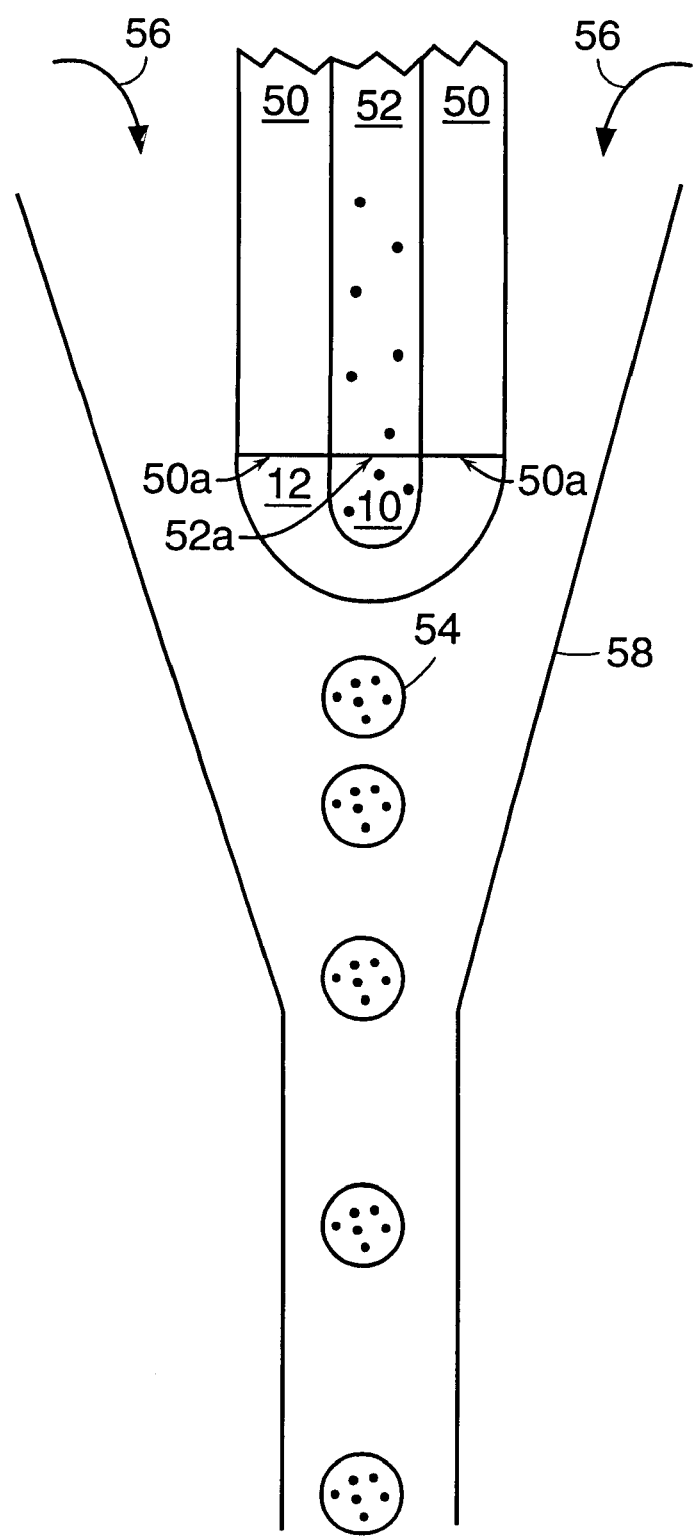
FIG. 7 depicts a schematic sectional view of two concentric nozzles forming adjacent channels where a gas flow assists droplet and capsule formation.

It is contemplated that there are several ways to decrease collisions between complex droplets such that substantially uniformly-sized complex droplets and substantially uniform capsules are formed. Three examples are described below. First, the distance between individually formed complex droplets can be increased by excitation amplitude modulation. For example, a vibrating member, such as a piezoelectric transducer, can be vibrated at larger amplitudes than those which lead to complex droplet collision. As the amplitude of the vibration increases and while formation of a jet still occurs, the spacing between the complex droplets increases and the number of collisions decreases. This solution may not be effective for large complex drops having diameters in the range of about millimeters. Second, and referring to FIG. 7, the distance between individually formed complex droplets can be increased by accelerating them away from the nozzle. The adjacent, concentric channels 50, 52 are, for example, placed at the wide end of a conical channel 58 through which a gas is flowed as indicated by direction of arrows 56. The gas carries the complex droplets 54 from the nozzle apertures 50a, 52a and through the conical channel 58. As the cross-sectional area of the conical channel 58 narrows, the gas velocity increases and the spacing between the complex droplets 54 increases, keeping them separated. Alternatively, if the complex droplets 54 either have or are given an electrical charge, this same effect can be created with electrical forces rather than with the force of gas pressure. Third, the external phase 12 shell can harden into a capsule wall in a shorter time period than the period during which the complex droplets 54 collide. Thus, the capsules are sufficiently formed such that, even if they collide, they will not coalesce. This effect can be achieved with very fast chemical reactions to create the wall or with very fast solvent evaporation during formation of the walls. These fast chemical reactions include those described above for cyanoacrylates or UV-curable systems. Fast evaporating solvents for use in the external phase can include dichloromethane. Alternatively, if the external phase 12 is aqueous, the external phase 12 can include sodium alginate that, when exposed to an aerosol of calcium chloride solution, hardens the external phase 12 shell into a capsule wall.

In certain embodiments, useful complex droplets can result in early-stage capsules with liquid walls that become solid at some later processing stage. These capsules are useful, for example, to coat into a close-packed monolayer of capsules, where highly deformable capsules assist in close packing. Typically, the capsules should be stored in some way that prevents their coalescence. For example, such capsules could be stored in a collection vessel that contains a solution containing a surfactant. The surfactant would adsorb to the outside of the non-solid-walled capsules and provide stability to the dispersion. The surfactants can include ionic, low molecular weight surfactants such as sodium dodecylsulfate; nonionic, low molecular weight surfactants such as Triton X-100 (available from Sigma, St. Louis, Mo.); ionic, polymeric surfactants such as poly sodium styrene sulfonate or sodium carboxymethyl celluloses; and nonionic, polymeric surfactants such as poly vinyl alcohol. An alternative method to prevent coalescence of early-stage capsules is to use high viscosity storage materials, such as liquids containing xanthum gum or containing aqueous phase thickeners such as Drewthix™ 53L (available from the Drew Industrial Division of Ashland Chemical Company, Boonton, N.J.), in the collection vessel to prevent capsule-capsule contact during storage.

In some embodiments of complex droplets suitable for electrophoretic displays, the internal phase is a dispersion of electrophoretic particles in a dielectric fluid and the external phase is a suitable fluid to form the wall material. Some considerations are relevant for these types of complex droplets. First, the internal phase fluid should be mixed before coextrusion so that all capsules have the same concentration of pigment particles. If the concentrations are not equal, the capsules formed from the complex droplets will have varying optical appearances and, as such, will result in non-uniform white states in the final device. Second, the electrophoretic particles in the internal phase should be kept colloidally stable during the coextrusion process. The particles should not be allowed to aggregate. For example, surfactants can be used; the particles can be made to include polymers on their surface to keep the particles sterically stabilized; or electrostatic repulsion can be used to keep the particles apart. Third, the coextrusion nozzle should be made of or coated with a material that is hard enough so that the dispersed pigment particles (such as titanium dioxide) in the internal phase do not abrade it. For example, sapphire and diamond are useful. Fourth, the wall material and/or the external phase preferably should be substantially insoluble in the internal phase during coextrusion and should be substantially chemically unreactive with it. However, in some techniques, for example, when the external phase contains a volatile solvent which is flash evaporated immediately after emergence from the nozzle, some intermixing between the phases can be tolerated. Fifth, the wall material should be substantially transparent to facilitate production and use of electrophoretic displays. Sixth, materials used in wall-forming chemical reactions should not react with materials in the internal phase. Seventh, if UV-polymerization is required to form the wall, the internal phase should not be sensitive to UV radiation (e.g., UV exposure can bleach dyes in the internal phase). Eighth, formation of the small 'satellite' droplets (i.e., droplets of internal phase and/or external phase that are smaller than the substantially uniformly-sized complex droplets) as the liquid jet disintegrates should be substantially prevented. These satellite droplets can form small capsules that have poor electro-optic properties when made into displays. Satellite droplets can be prevented by making sure disintegration of the compound jet occurs in the range of Rayleigh instability. Ninth, the rheology of the internal and external phases should be chosen so that coextrusion yields capsules that have an outer capsule wall and that the internal phase and the external phase do not mix. If the rheology is not properly chosen, the flow of the internal and external phases, in mutual contact in a jet, can lead to shear induced mixing of the phases in the jet, leading to poor capsules. For example, the fluids should not be so viscous that insufficient instability is present to have a controlled disintegration of the compound jet into substantially uniformly-sized complex droplets.

In certain embodiments, capsules for some electrophoretic displays have diameters of about 300 $\mu$m. To produce such capsules, according to the equations above, nozzle apertures of about 150 $\mu$m are useful in the practice of this method. The inner nozzle containing the internal phase should be almost 150 $\mu$m and the outer nozzle containing the external phase typically should be only slightly larger than the inner nozzle. This technique creates a complex droplet (that can be hardened into a capsule) with a relatively thin shell of external phase compared with the much larger core of internal phase. (However, in some situations, the size of the outer nozzle will vary from that described above depending upon the concentration of capsule wall-forming material in the external phase. For example, where the external phase is a dilute solution of a polymer in a solvent, more external phase than internal phase may need to be pumped, which still leads to a relatively thin shell formed from the external phase.) Also, the vibrating member, if used, should have excitation frequencies between about 0.5 kHz (at about a 1 ml/min flow rate) to about 80 kHz (at about a 15 ml/min flow rate) to produce complex droplets of about 300 $\mu$m in diameter. This excitation in readily applied to the internal phase in the central channel and nozzle by, for example, having a piezoelectric transducer in contact with the internal phase upstream from the nozzle.

Transparent walls can be formed from epoxy monomers in the external phase when these monomers are exposed to UV light and polymerize. A relatively fast chemical reaction is desirable to produce complex droplets that are sufficiently hardened into capsules before potential collision events with other complex droplets, fluids, capsules or structures occur. Low viscosity epoxy monomers can provide smooth fluid flow through the nozzle. Also, a dilute solution of a transparent elastomeric polymer in the external phase can yield useful capsule walls when a solvent in the external phase is evaporated. In this case, rapid solvent loss (to increase the speed of capsule wall formation) can be encouraged by coextrusion of the internal and external phases into a warm and/or reduced-pressure gas.

Figure 8:
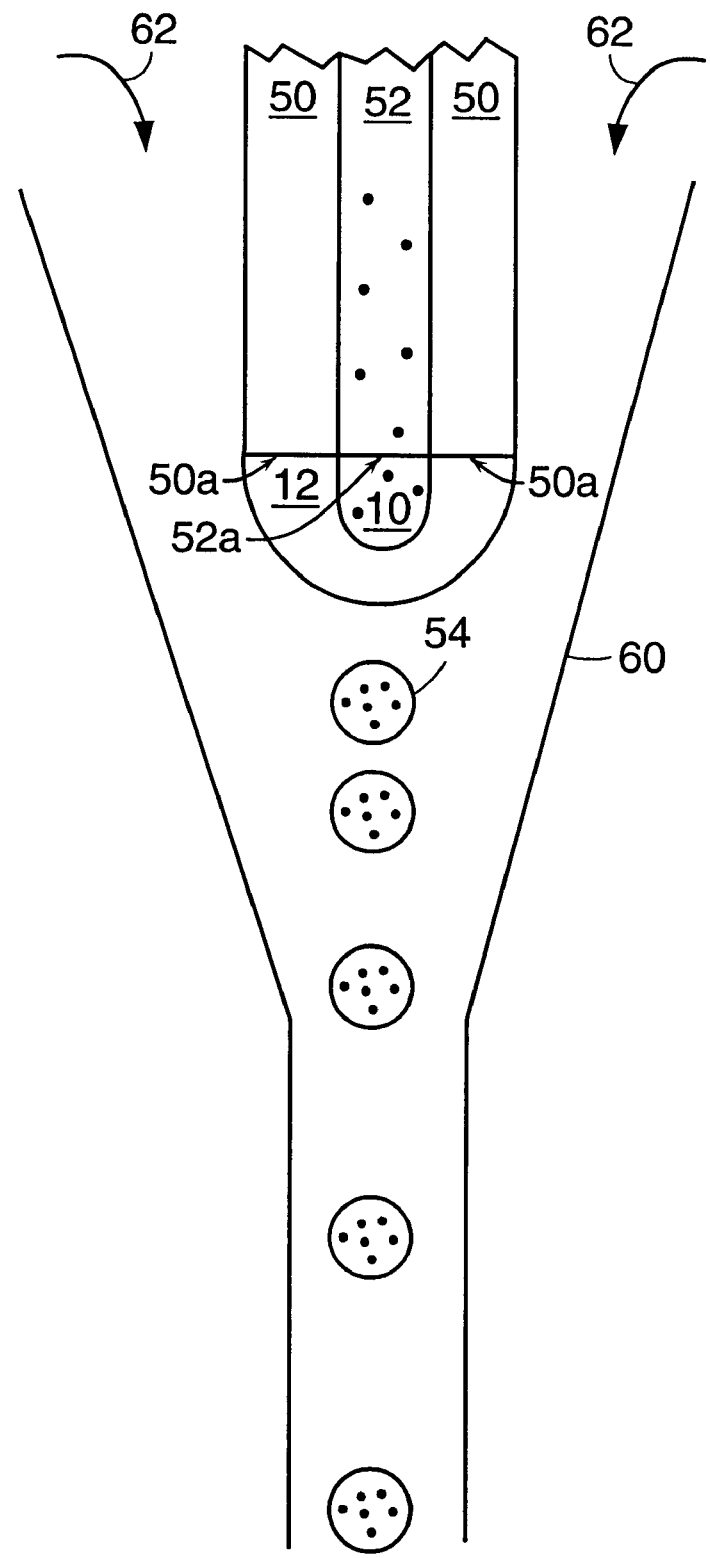
FIG. 8 depicts a schematic sectional view of two concentric nozzles forming adjacent channels where droplets and capsules are extruded into a flowing collection liquid.

After production, the complex droplets or capsules can be collected in an appropriate liquid for storage. Because the capsules are eventually mixed with a binder and coated onto a flat surface, the complex droplets or capsules can be collected into the binder directly, or into a material which is readily miscible with the binder. In the case of water-based binders, this fluid can be water. Measures can be taken to prevent the complex droplets or capsules from sticking to one another in the collection liquid. Surfactants and/or dispersing agents can be used in the collection liquid to prevent the complex droplets or capsules from sticking to each other. Also, the collection liquid can be a quiescent reservoir positioned below the jet of external and internal phase so that capsules with hardened walls will fall into the collection liquid. However, forming the complex droplets or capsules through a nozzle that is submerged in the collection fluid can yield a substantial coalescence of the coextruded internal and external phase, because the newly-formed jet of the internal phase and the external phase is stopped by the collection fluid quickly, preventing complex droplet and capsule formation. However, the collection liquid can be flowed in the same direction as the jet stream of the internal and external phases. For example, and referring to FIG. 8, collection liquid 64 is located in a structure 60 and is moved in a direction (indicated by arrows 62) that is substantially similar to the direction in which the external 12 and internal 10 phases are extruded from the channels 50, 52 with nozzles 50a, 52a. Typically, the collection liquid 64 flows at a velocity that is similar velocity to that of the jet of internal 10 and external 12 phases, but the velocity can be greater than that of the jet in order to produce a separation effect as described for FIG. 7, above.

Alternatively, a three-channel, three-aperture nozzle can be used to collect complex droplets or capsules. In this system, in addition to the two concentric channels and nozzles containing the internal and external phases, described above, the collection liquid is extruded through a third channel and nozzle. The third channel is concentric about both of the concentric channels containing the internal and external phases, and collection liquid flows through the outermost aperture and three-phase droplets are formed. The third aperture issues the collection liquid in contact with the external phase from the middle nozzle.

Figure 9:
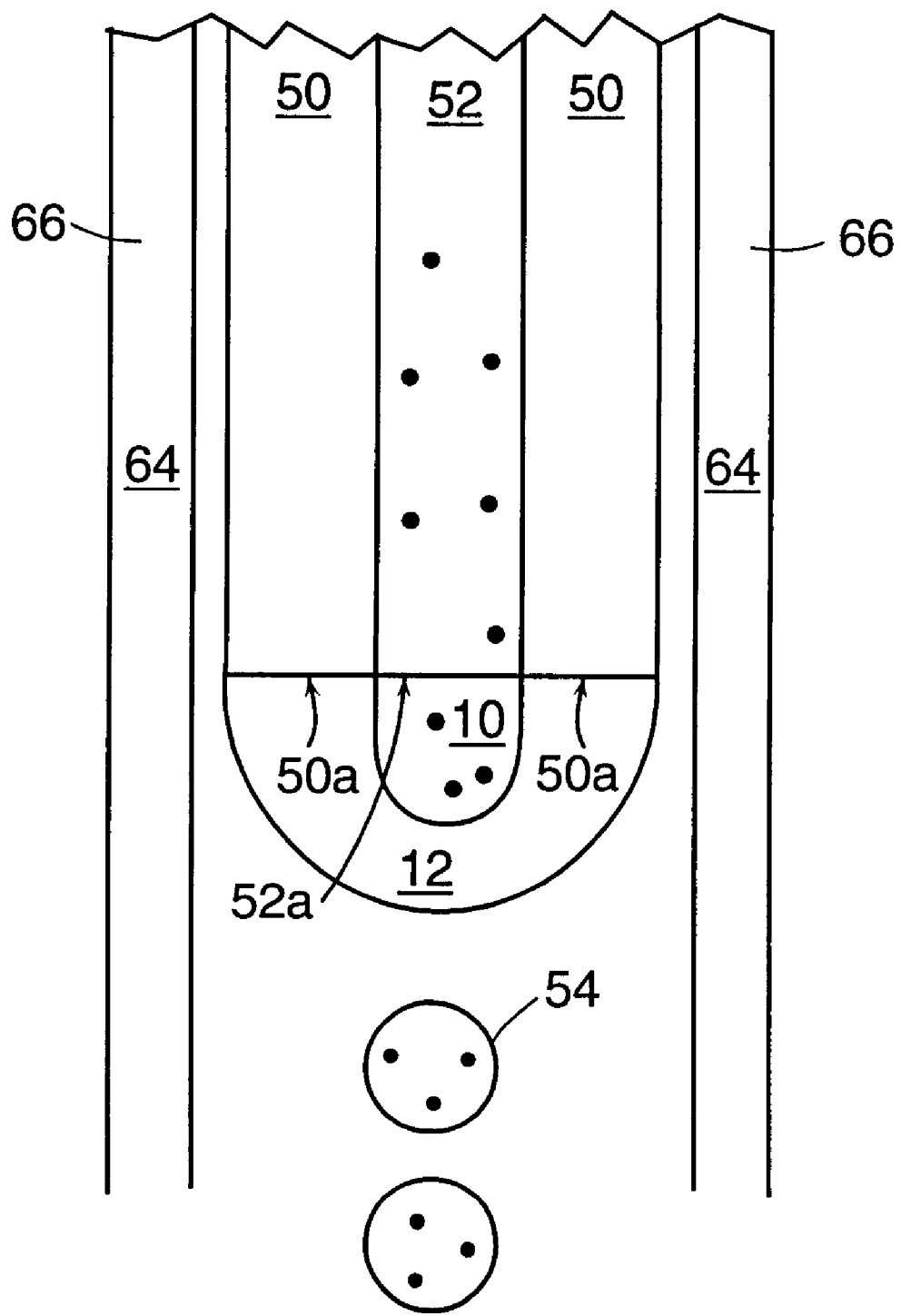
FIG. 9 depicts a schematic sectional view of three concentric nozzles forming three adjacent channels, one of which contains a collection liquid.

Alternatively, and referring to FIG. 9, a separate stream of collection liquid 64 is extruded through an outer channel 66 with a nozzle that is concentric with a second channel 50 with nozzle 50a that is concentric with a third channel 52 with nozzle 52a. The hollow cylinder of collection liquid 64 collapses at some distance from the nozzle (not shown) of the outer channel 66. The point at which the collection liquid 64 converges can be the same point at which it collides with a collection container (or any liquid within the collection container). This effect can be accomplished by adjusting the collection liquid 64 flow rate and/or distance from the collection container. The complex droplets (or capsules), themselves, are contained within the collapsing hollow cylinder of collection liquid 64 issuing from the outer nozzle of the outer channel 66. This situation substantially prevents complex droplet or capsule aggregation and assists with transfer of complex droplets or capsules to the collection container. If the walls of the capsules are formed from solvent evaporation, the solvent still needs to be removed from this system, even though the train of complex droplets is surrounded by another liquid. For example, if the solvent has some water solubility (for example, but without limitation, at least about 1% or less) and a lower boiling point than water, the complex droplets can be collected into water and heated or subjected to reduced pressure. The solvent will move into the water and then be evaporated from the water. Also, the collection liquid 64 can be a binder with which the capsules are coated to a substrate when constructing an encapsulated electrophoretic display, obviating the need for a separate step to mix the capsules with the binder.

Alternatively, capsules can be formed as a dry powder that is mixed with a liquid binder for coating onto a substrate. Typically, aggregates of capsules impair coating performance. Thus, capsules should be prevented from sticking to one another, or, if the capsules are not prevented from sticking to one another, the adhesion can be reversed when the capsules are mixed with binder.

In other situations, a pair of immiscible fluids can be mixed into a droplet, before a separate encapsulation step to form a capsule containing two immicible fluids, using two concentric nozzles that are in communication with a pump. One of the fluids is expelled through one of the nozzles, and the other fluid is expelled through the other nozzle. This droplet can then be encapsulated, assuming the fluids are chemically compatible with the encapsulation solvent, by, for example, gelatin/acacia encapsulation. In cases where encapsulation techniques and the fluids to be encapsulated are incompatible, for example, a physical coextrusion process can be used to encapsulate the droplet. In such a process, three concentric nozzles are attached to a pump. The droplets can be formed by pumping a dye-containing fluid solution through the inner nozzle, a particle dispersion-containing fluid through the middle nozzle, and an encapsulating polymer (as a solution or a melt) through the outer nozzle. As the fluids and polymer emerge from the nozzles, capsules are formed. Once the encapsulated droplets emerge from the nozzles, the capsules can be hardened by evaporating a solvent or solvents used during the pumping procedure or, if any of the materials are pumped through the nozzle at a temperature greater than the ambient temperature, by cooling the capsules. Thus, a capsule with two immicible fluids, one containing particles, is produced.

During formation of unencapsulated droplets or encapsulated droplets according to the invention, several variables can be manipulated, depending upon, for example, the materials used. In the instance with two nozzles that form unencapsulated droplets, the dyed-fluid is pumped through the central nozzle and a second immiscible fluid containing dispersed particles is pumped through the outer nozzle, forming droplets. The droplets are extruded into an aqueous phase that has been prepared for encapsulation, described below. The droplets can be made one at a time using relatively low flow rates of the fluids through the nozzles, or the fluids can be co-extruded at relatively higher flow rates, for example, as a liquid jet that breaks up by Rayleigh instability into individual droplets. In either case, droplet formation can be assisted by vibration of the concentric nozzles using, for example, a piezoelectric stack. In order to ensure the correct droplet morphology (two subdroplets forming a droplet), the spreading coefficients of the various liquids can be controlled. The spreading coefficient is a description of how one fluid spreads over another fluid.

The spreading coefficient can be mathematically modeled. Denoting the three liquids in the two-nozzle system as A, B, C where B is the encapsulation fluid (water), the three spreading coefficients for the three liquids are defined as:

$$S(A)=g(BC)-[g(AB)+g(AC)]$$
$$S(B)=g(AC)-[g(AB)+g(BC)]$$
$$S(C)=g(AB)-[g(AC)+g(BC)]$$

where g is the interfacial tension between two liquids. Assigning the liquids so that g(AB)>g(BC), droplets (containing a dye-fluid subdroplet and a particle-dispersed fluid subdroplet) can maintain a desired morphology when $S(A)<0$
$S(B)<0$
$S(C)>0$.

If the triple concentric nozzle encapsulation method is employed to produce capsules directly (no aqueous encapsulation step), then the same analysis determines the necessary interfacial tensions between the three liquids, except liquid B refers to the wall forming liquid extruded from the outermost nozzle. Liquid A and liquid B remain the two immiscible fluids from above. Generally, interfacial tensions in the three-nozzle system are set such that the encapsulating material preferentially wets the particle dispersion-containing fluid and/or such that the particle dispersion-containing fluid will preferentially wet the dye-containing fluid.

Other examples of variables that can be altered, depending upon the particular compounds employed in droplet formation and encapsulation, include pumping rate, flow rate, and viscosity. Typically, at least one of the pumping rates through one nozzle is different from another one of the pumping rates through a different nozzle. Also, the flow rate of materials through the nozzles, relative to each other, as well as the overall flux of material through the nozzles, can be varied. Also, the viscosity of the materials coming through the nozzles can affect the final morphology of the droplets.

In several of the techniques described above, such as producing concentric jets of the internal and external phases, the apertures (e.g., nozzles) should be aligned so that they are concentric. As described below, two or more apertures can be aligned concentrically with high precision. The apertures can be on the same or on different planes. Also, the technique can be used to ensure that an array of apertures aligns concentrically with another array of apertures.

Alignment tolerances of about ±25 µm are achievable with current techniques. However, when it is essential to align apertures to within a tighter tolerance than about ±25 µm, traditional mechanical alignment methods (e.g., hard stops) become prohibitively expensive and difficult to implement. Using kinematic coupling techniques to align two or more apertures in two or more plates provides an alternative to current techniques. A kinematic coupling design may be implemented simply, cost-effectively achieving a precision alignment of the small apertures. Moreover, with kinematic coupling techniques, the attainable level of precision can be improved from that of current techniques, particularly when apertures are smaller than about 100 µm. For example, apertures that are less than 50 µm in diameter should be aligned within a tolerance of at least about 1 µm to about 10 µm, which is readily achievable using a kinematic coupling design.

The present technique provides a mechanical alignment method that is low cost, precise, and repeatable. As shown in FIGS. 15A–15D, a kinematic coupling is used to precisely maintain the spacing between and alignment of multiple plates containing apertures. A kinematic coupling typically is used for very large objects (e.g., metrology frames used in large, precision machines) rather than small objects, such as the plates with apertures used in coextrusion as described above. The kinematic coupling is composed of the plates 120, 122, each plate 120, 122 with an aperture 124, 144 and with three triangular cross-section grooves 126, 128, 130, 132, 134, 136 (best shown in FIG. 15B as section A—A through one of the grooves 128 of FIG. 15A) in the surface of each plate 120, 122, and spherical balls 138, 140, 142 rigidly affixed in the grooves of one plate 122. The coupling maintains repeatable, precise alignment by providing 6 contact points (often referred to as "bearing surfaces") between the surfaces of the balls 138, 140, 142 and the plates 120, 122. The geometry of the coupling is chosen so that the six contact points fully constrain the motion of the plates 120, 122 with respect to one another.

Figure 16A:
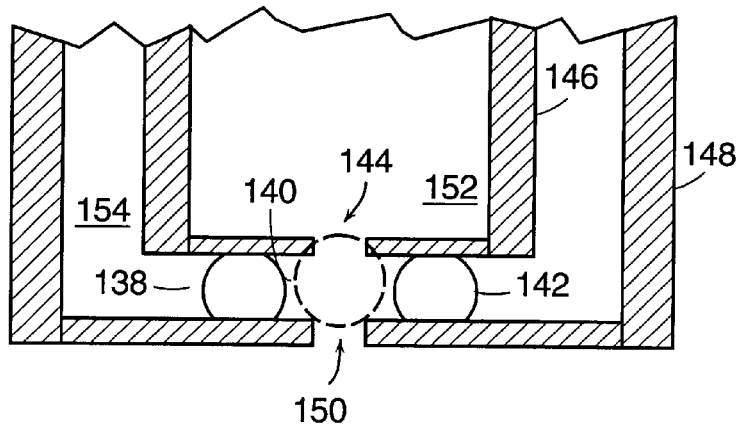
FIG. 16A shows a schematic side sectional view of two aligned coextrusion plates.
Figure 16B:
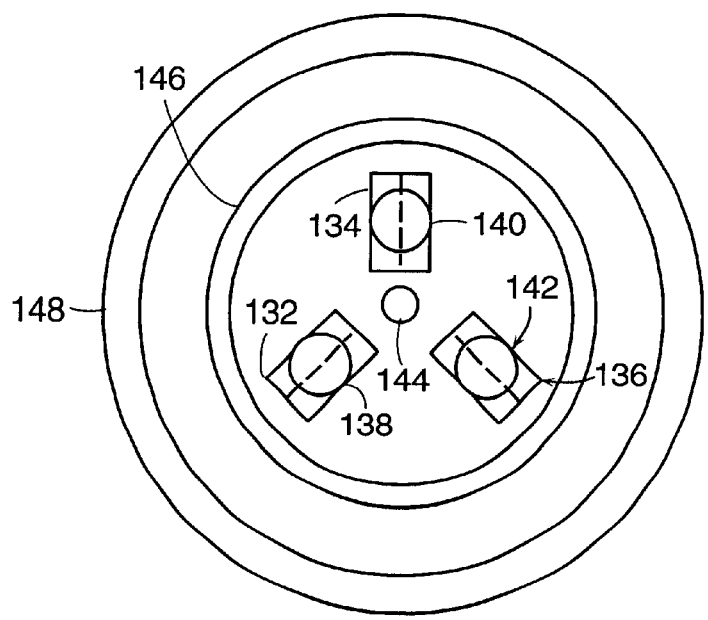
FIG. 16B shows a schematic end view of the plates of FIG. 16A.

FIGS. 16A and 16B show a coextrusion system aligned with the kinematic technique. A first plate 146 with grooves 132, 134, 136 and balls 138, 140, 142 and an aperture 144 is aligned with a second plate 148 with a second aperture 150. Adjacent channels 152, 154 are formed within the plates 146, 148. For the coextrusion system design sketched in FIG. 16A and 16B, it is preferable, based upon stability and symmetry considerations, to configure the grooves 132, 134, 136 (the grooves of the second plate 148 are not shown) and balls 138, 140, 142 such that they form an equilateral triangle about the apertures 144, 150. The balls can be replaced with other shapes, such as cylinders with hemispherical ends.

Figure 17:
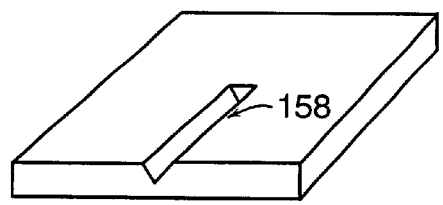
FIG. 17 shows schematic view of a triangular cross-section trench produced with photolithography and etching.

Several microfabrication technologies are contemplated to be useful in manufacturing kinematic coupling-based devices that coextrude an internal phase and an external phase (or any coextruded materials). Referring to FIG. 17, crystalline silicon wafers may be patterned, using photolithography techniques, to produce triangular cross-section trenches 158. These trenches may be used as the grooves for the kinematic coupling. Similar techniques can be used on coextrusion plates. Aperture holes may be drilled through the plates using many techniques, such as wet etching, dry etching, or laser drilling techniques.

The balls for kinematic alignment may be made from such materials as alumina, sapphire, or ruby. The balls can be attached to the plates using techniques such as high temperature bonding or epoxy bonding. The ball diameter influences the stiffness of the kinematic coupling and also controls the separation distance between the surfaces of the two plates. This distance between the two plates influences the flow of fluid through the gap between the plates. A smaller gap corresponds with a higher pressure drop and a larger gap corresponds with a lower pressure drop. A very large pressure drop in the system is undesirable, as is turbulence in some embodiments.

Figure 18:
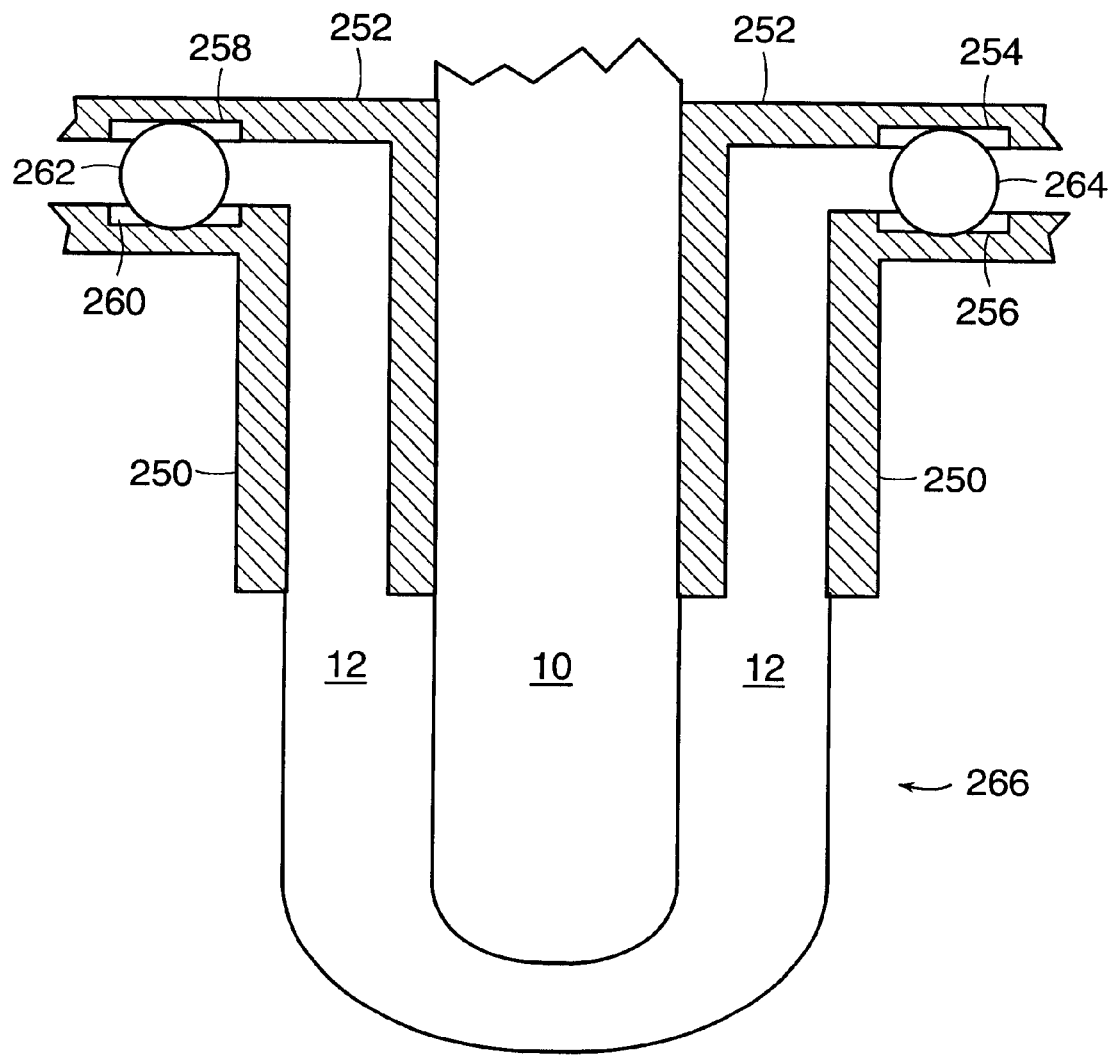
FIG. 18 shows a schematic side sectional view of a plate configuration for coextrusion that is coupled with a kinematic coupling.

Now referring to FIG. 18, another configuration of two plates 250, 252 form a coextrusion design for producing a compound jet 266. The configuration is similar to that shown in FIGS. 5A and 5B and produces a similar compound jet. These plates generally are aligned using the kinematic coupling technique outlined above. Grooves 254, 258 (only two are shown) are provided in a first plate 252 that align with grooves 256, 260 (only two are shown) in a second plate 250. Balls 262, 264 (only two are shown) are seated in the grooves 254, 256, 258, 260 and align the plates 250, 252.

The plates 250, 252 form two adjacent, concentric channels through with the internal phase 10 and the external phase 12 flow. The internal 10 and external 12 phases emerge from apertures (e.g., nozzles) and form a compound jet.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for forming substantiall3y uniform droplets, the method comprising the steps of:
   (a) providing a non-aqueous internal phase comprising a plurality of particles suspended in a first fluid;
   (b) providing an external phase comprising a second fluid;
   (c) vibrating the internal phase; and
   (c) applying the internal phase to the external phase, wherein a series of droplets of substantially uniform size is formed.
2. The method of claim 1 wherein the first fluid comprises an oil.
3. The method of claim 1 wherein the second fluid comprises an aqueous solution.
4. The method of claim 1 wherein the step of applying the internal phase to the external phase comprises containing the internal phase in a structure and pressurizing the internal phase, thereby to cause the internal phase to issue from the structure into the external phase.
5. The method of claim 4 wherein the internal phase issues through at least one aperture.
6. The method of claim 4 wherein the internal phase issues in at least one train of droplets.
7. The method of claim 4 wherein the internal phase is applied to the external phase at a plurality of locations.
8. The method of claim 1 wherein a droplet has a diameter of about 20 $\mu$m to about 300 $\mu$m and has a substantially uniform size relative to other droplets in the series of droplets.
9. The method of claim 1 wherein the step of vibrating the internal phase comprises vibrating the internal phase with a vibrating member.
10. The method of claim 9 wherein the vibrating member comprises a piezoelectric transducer.
11. The method of claim 1 wherein the step of vibrating the internal phase comprises vibrating a conduit containing the internal phase.
12. The method of claim 11 wherein the internal phase issues from the conduit in two trains of droplets.
13. The method of claim 11 wherein a tip of the conduit, through which the internal phase issues into the external phase, is in communication with the external phase.
14. The method of claim 1 wherein the step of applying the internal phase to the external phase comprises simultaneously issuing the internal phase and the external phase through two adjacent channels.
15. The method of claim 14 wherein the two channels terminate at two concentric nozzles.
16. The method of claim 1 further comprising the step of mixing the particles with the first fluid.
17. The method of claim 16 wherein the step of mixing comprises inducing a flow within the internal phase.
18. The method of claim 1 wherein the droplets comprise the internal phase.
19. The method of claim 1 wherein the droplets comprise the internal and external phases.
20. A method for forming substantially uniform droplets, the method comprising the steps of:
   (a) providing a non-aqueous internal phase comprising a plurality of particles suspended in a first fluid;
   (b) providing an external phase comprising a second fluid; and
   (c) applying the internal phase to the external phase through an aperture in a container, wherein the internal phase is moved relative to the external phase such that as the internal phase contacts the external phase a droplet separates from a remainder of the internal phase and such that a series of droplets of substantially uniform size is formed.
21. The method of claim 20 further comprising the step of vibrating the internal phase.
22. A method for forming substantially uniform droplets, the method comprising the steps of:
   (a) providing a non-aqueous internal phase comprising a plurality of particles suspended in a first fluid;
   (b) providing an aqueous external phase comprising a second fluid; and
   (c) applying the internal phase to the external phase, wherein the internal phase is pressurized and pulsed through a valve such that the internal phase forms a series of droplets of substantially uniform size.

* * * * *

UNITED STATES PATENT AND TRADEMARK OFFICE
CERTIFICATE OF CORRECTION

PATENT NO. : 6,377,387 B1
DATED : April 23, 2002
INVENTOR(S) : Gregg M. Duthaler and Andrew L. Loxley It is certified that error appears in the above-identified patent and that said Letters Patent is hereby corrected as shown below:

<u>Column 27,</u>
Lines 12-21, claim 1 should read as follows:
-- 1. A method for forming substantially uniform droplets, the method comprising the steps of:
(a) providing a non-aqueous internal phase comprising a plurality of particles suspended in a first fluid;
(b) providing an external phase comprising a second fluid;
(c) vibrating the internal phase; and
(d) applying the internal phase to the external phase, wherein a series of droplets of substantially uniform size is formed. --

Signed and Sealed this

Fifteenth Day of October, 2002

*Attest:*

*Attesting Officer*

JAMES E. ROGAN
*Director of the United States Patent and Trademark Office*